(12) United States Patent
Jean et al.

(10) Patent No.: US 7,552,239 B2
(45) Date of Patent: Jun. 23, 2009

(54) NETWORK DEVICE MIMIC SUPPORT

(75) Inventors: Sebastien A. Jean, Tustin, CA (US); Don Francis Purpura, Yorba Linda, CA (US); Neil Y. Iwamoto, Mission Viejo, CA (US)

(73) Assignee: Canon Information Systems, Inc., Irvine, CA (US)

( * ) Notice: Subject to any disclaimer, the term of this patent is extended or adjusted under 35 U.S.C. 154(b) by 739 days.

(21) Appl. No.: 09/853,767

(22) Filed: May 14, 2001

(65) Prior Publication Data

US 2002/0169884 A1 Nov. 14, 2002

(51) Int. Cl.
*G06F 15/16* (2006.01)
*G06F 15/177* (2006.01)
*G06F 15/173* (2006.01)
*G06F 3/12* (2006.01)
*H04L 12/28* (2006.01)

(52) U.S. Cl. ............... 709/249; 709/220; 709/229; 709/223; 709/230; 358/1.15; 370/389

(58) Field of Classification Search ........ 709/223, 709/220, 229, 249, 230; 358/1.15; 370/389
See application file for complete search history.

(56) References Cited

U.S. PATENT DOCUMENTS

| | | | |
|---|---|---|---|
| 5,497,463 A | 3/1996 | Stein et al. | 395/200.03 |
| 5,568,612 A | 10/1996 | Barrett et al. | 395/200.01 |
| 5,768,525 A | 6/1998 | Kralowetz et al. | 395/200.58 |
| 5,832,191 A | 11/1998 | Thorne | 395/114 |
| 5,935,224 A | 8/1999 | Svancarek et al. | 710/63 |
| 5,949,779 A | 9/1999 | Mostafa et al. | 370/389 |

(Continued)

FOREIGN PATENT DOCUMENTS

EP 909075 4/1999

(Continued)

OTHER PUBLICATIONS

Nassif, Rodolphe et al., "Issues and approaches for migration/cohabitation between legacy and new systems", Association for Computing Machinery, 1993, pp. 471-474.

(Continued)

*Primary Examiner*—Philip C Lee
(74) *Attorney, Agent, or Firm*—Fitzpatrick, Cella, Harper & Scinto

(57) ABSTRACT

The mimicking of network devices in a computing device having first and second network interface cards, the first network interface card connecting the computing device to an external network and the second network interface card connecting the computing device to a local network. The invention includes receiving an incoming message from a client network device residing on the external network, the incoming message being directed to a legacy network device residing on the local network, and determining if the incoming message requires a function provided by an application module residing in the computing device. In the case that the incoming message requires a function provided by the application module, the incoming message is redirected to the application module which performs the required function in response to the incoming message. In the case that the incoming message does not require a function provided by the application module, the incoming message is passed through the local network to the legacy network device residing on the local network.

31 Claims, 16 Drawing Sheets

U.S. PATENT DOCUMENTS

| | | | | |
|---|---|---|---|---|
| 6,020,973 | A | * | 2/2000 | Levine et al. ............... 358/1.15 |
| 6,032,208 | A | | 2/2000 | Nixon et al. ................... 710/64 |
| 6,052,788 | A | | 4/2000 | Wesinger, Jr. et al. ........ 713/201 |
| 6,058,429 | A | | 5/2000 | Ames et al. .................. 709/242 |
| 6,073,266 | A | | 6/2000 | Ahmed et al. ............... 714/749 |
| 6,088,120 | A | | 7/2000 | Shibusawa et al. .......... 358/1.15 |
| 6,098,116 | A | | 8/2000 | Nixion et al. ................... 710/8 |
| 6,128,664 | A | | 10/2000 | Yanagidate et al. .......... 709/228 |
| 6,131,163 | A | | 10/2000 | Wiegel et al. ............... 713/201 |
| 6,157,950 | A | * | 12/2000 | Krishnan .................... 709/223 |
| 6,163,383 | A | | 12/2000 | Ota et al. .................... 358/11.4 |
| 6,163,806 | A | | 12/2000 | Viswanathan et al. ....... 709/229 |
| 6,205,416 | B1 | | 3/2001 | Butts et al. .................... 703/27 |
| 6,240,456 | B1 | * | 5/2001 | Teng et al. ................... 709/230 |
| 6,611,863 | B1 | * | 8/2003 | Banginwar .................. 709/220 |
| 6,727,998 | B1 | * | 4/2004 | Tomiyasu ................... 358/1.15 |
| 6,742,039 | B1 | * | 5/2004 | Remer et al. ................. 709/229 |
| 6,757,280 | B1 | * | 6/2004 | Wilson, Jr. ................... 370/389 |
| 6,816,270 | B1 | * | 11/2004 | Cooper et al. .............. 358/1.13 |
| 2002/0080391 | A1 | * | 6/2002 | Sugiura et al. ............. 358/1.15 |

FOREIGN PATENT DOCUMENTS

| | | | |
|---|---|---|---|
| JP | 2000172466 A | * | 6/2000 |
| JP | 2003-509969 | | 3/2003 |
| WO | 00/16531 | | 3/2000 |
| WO | WO 01/20870 | | 3/2001 |

OTHER PUBLICATIONS

Robertson, Paul, "Integrating Legacy Systems with Modern Corporate Applications", Communications of the ACM, May 1977, vol. 40, No. 5, pp. 39-46.

* cited by examiner

TARGET DESCRIPTOR TABLE 76

| TARGET | ETHERNET ADDRESS | IP ADDRESS | IP NETWORK MASK | DEFAULT ROUTER | SNMP DEVICE ID |
|---|---|---|---|---|---|
| PRINTER A | 09:F2:12:94:B4:01 | 128.16.210.12 | 255.255.255.255 | 201.16.195.4 | 5.6.3.9.2.7.6 |
| PRINTER B | 07:19:C4:85:A2:2C | 128.16.210.10 | 255.255.255.255 | 201.16.195.4 | 3.7.5.1.7.8.5 |

*FIG. 4*

IN TABLE 110

| TABLE 120 | TIMEOUT 121 | SOURCE IP 122 | DESTINATION IP 124 | SOURCE PORT 125 | DESTINATION PORT 126 | ACTION 128 |
|---|---|---|---|---|---|---|
| IN | STATIC | [LOCAL] | * | [DYN] | * | BRANCH |
| IN | A\10 MIN | 126.18.95.6 | 85.210.1.12 | 49651 | 60 | REDIRECT |
| IN | STATIC | * | * | * | * | ACCEPT |

FIG. 8A

OUT TABLE 111

| TABLE 120 | TIMEOUT 121 | SOURCE IP 122 | DESTINATION IP 124 | SOURCE PORT 125 | DESTINATION PORT 126 | ACTION 128 |
|---|---|---|---|---|---|---|
| OUT | STATIC | * | [LOCAL] | * | [DYN] | BRANCH |
| OUT | STATIC | * | * | * | * | ACCEPT |

FIG. 8B

ROUTING TABLE 74

| DESTINATION | NETMASK | GATEWAY | DEVICE | NOTES |
|---|---|---|---|---|
| 0.0.0.0 | 0.0.0.0 | 201.115.12.224 | EXT | DEFAULT ROUTER |
| 127.0.0.0 | 255.0.0.0 | 127.0.0.1 | LOOP | LOOPBACK |
| 195.52.186.69 | 255.255.255.255 | 127.0.0.1 | LOOP | LOCAL NETWORK DEVICE |
| 201.115.12.0 | 255.255.255.0 | 201.115.12.38 | EXT | EXTERNAL SIDE NETWORK |
| 201.115.12.38 | 255.255.255.255 | 195.52.186.69 | LCL | PRINTER A |
| 201.115.12.89 | 255.255.255.255 | 195.52.186.69 | LCL | PRINTER B |

FIG. 11

NETWORK DEVICE MIMIC SUPPORT

BACKGROUND OF THE INVENTION

1. Field of the Invention

The invention concerns the mimicking of legacy network devices to extend the functional capabilities of the legacy network devices. Specifically, the invention is used to represent one or more legacy network devices by isolating the legacy network devices from the external network and by transparently acting on behalf of the legacy network devices for function requests which they do not inherently support.

2. Description of the Related Art

Large network environments, such as a network for supporting a business office environment, often contain many network devices, such as network printers, of different types and generations having different functional capabilities. As new technologies emerge and improved functionality is implemented in new models or generations of network devices, the functions available within a network can vary greatly depending on which network device is being utilized. For example, some newer printers in the network environment may support secure printing while the older printers in the network environment do not support secure printing.

It is generally desirable to implement new technologies and improvements across an entire network environment, thereby making the same set of functional capabilities available to all network users for all network devices. Otherwise, some network users may be excluded from taking advantage of new beneficial capabilities, such as secure printing and e-mail printing, if their assigned network device does not support the new functionality supported by other newer network devices.

One solution to this problem is to simply replace all legacy network devices with new network devices having the desired new functional capabilities. The effort and expense involved in undertaking this solution is great, and is impracticable when new enterprise applications requiring new functional capabilities are implemented on a frequent basis.

Alternatively, another solution to this problem is to modify the legacy network devices by downloading new firmware to each legacy network device. However, this solution also requires significant effort by a network administrator or service person to physically access each legacy network device and then download an appropriate version of firmware to make the legacy device support functionality consistent with other network devices. In many cases, it is not possible to download a new version of firmware to the legacy device for implementation of a new function because of hardware and design limitations of the legacy device.

Yet another solution to the problem is to place a support device on the network near each legacy network device for supporting the desired additional functionality for the corresponding legacy network device. This solution has the drawback of not being transparent to users of the legacy network devices, thereby requiring network users to be aware of the IP address for the support device corresponding to a given legacy network device in order to utilize the additional functionality provided by the support device.

SUMMARY OF THE INVENTION

The present invention addresses the foregoing problems by mimicking legacy network devices, such as printers, to provide additional functional capabilities for the legacy network devices. In particular, the invention discovers legacy network devices on a local network and responds to network messages on an external network which are directed to the legacy network devices. The term "legacy network devices" as used herein includes both older network devices and newer network devices which lack the ability to support a desired enterprise functionality, such as e-mail printing. Accordingly, the invention performs additional functions on behalf of the legacy network devices in a manner which is transparent to client devices on the external network. The presence of the e-mail mimic device can also be made transparent to the legacy network devices on the local network.

Accordingly, one aspect of the invention concerns the mimicking of network devices in a computing device having first and second network interface cards, the first network interface card connecting the computing device to an external network and the second network interface card connecting the computing device to a local network. The invention includes receiving an incoming message from a client network device residing on the external network, the incoming message being directed to a legacy network device residing on the local network, and determining if the incoming message requires a function provided by an application module residing in the computing device. In the case that the incoming message requires a function provided by the application module, the incoming message is redirected to the application module which performs the required function in response to the incoming message. In the case that the incoming message does not require a function provided by the application module, the incoming message is passed through the local network to the legacy network device residing on the local network.

Preferably, the application module sends local messages over the local network to communicate with a corresponding legacy network device, and each such local message uses a preset IP address of the second network card as the source IP address. If desired, the local message from the application module can use the IP address of the client network device as the source IP address in the message. The application module also sends messages to the client network device and uses the IP address of the corresponding legacy network device as the source IP address in the message to the client network device. In addition, all legacy network devices on the local network are discovered by listening to traffic on the local network and then sending discovery requests to the detected legacy network devices to obtain information related to the devices. The mimic device then periodically polls the discovered legacy network devices to determine their current status. A set of rules is used in the determining step to determine if an incoming message should be redirected to the application module or passed over the local network to the corresponding legacy network device. Rules are created based on the discovery information for each legacy network device. Rules are also dynamically created based on ports that are initiated by both the application module and the legacy network devices. Preferably, the invention also prevents the legacy network devices and the application module from using the same port identifiers.

By virtue of the foregoing, the invention provides an efficient way to extend the functional capabilities of legacy network devices in a manner which is transparent to other devices on the external network. Accordingly, the cost and time associated with purchasing new network devices or upgrading firmware in all legacy network devices in the network environment is avoided. The network administrator does not have to publish the existence of the mimic device to all other network users because the mimic device is transparent by acting on behalf of legacy network devices for functionality which the legacy network devices would not otherwise support.

In another aspect of the invention, the invention concerns mimicking network devices through a computing device having first and second network interface cards, the first network interface card connecting the computing device to an external network and the second network interface card connecting the computing device to a local network. The invention includes discovering a plurality of legacy network printers on the local network by detecting messages on the local network from each of the plurality of legacy network printers, and creating a rule in a rules table for each of the discovered legacy network printers, each rule containing the IP address of the corresponding legacy network printer and indicating whether an application module in the computing device performs a function on behalf of the corresponding legacy network printer. The invention further includes receiving an incoming message from a client network device residing on the external network, the incoming message being directed to an IP address of a designated one of the plurality of legacy network printers, and determining, based on the rule corresponding to the designated legacy network printer, if the incoming message requires a function performed by the application module. In the case that the incoming message requires support from the application module, the incoming message is redirected to the application module which performs the required function in response to the incoming message. In the case that the incoming message does not require a function provided by the application module, the incoming message is passed through the local network to the designated legacy network printer.

Preferably, the application module sends local messages over the local network to communicate with the corresponding legacy network printer, and each such local message uses a preset IP address of the second network card as the source IP address. If desired, the local message from the application module to the legacy network printer can use the IP address of the client network device as the source IP address in the message. The application module also sends messages to the client network device and uses the IP address of the corresponding legacy network printer as the source IP address in the message to the client network device. In addition, the discovery of each legacy network printer includes sending a discovery request to each detected legacy network printer to obtain information related to the printer. Rules are also dynamically created based on ports that are initiated by both the application module and the legacy network printers. Preferably, the invention prevents the legacy network printers and the application module from using the same port identifiers. It should be noted that the mimic device can use one or more discriminators in addition to the IP address in a message to determine whether the mimic device should capture and respond to the message on behalf of one of the legacy network devices.

By virtue of the foregoing, the invention provides an efficient way to extend the functional capabilities of legacy network printers in a manner which is transparent to other devices on the external network. Accordingly, the cost and time associated with purchasing new network printers or upgrading firmware in all legacy network printers in the network environment is avoided. The network administrator does not have to publish the existence of the mimic device to all other network users because the mimic device is transparent by acting on behalf of legacy network printers for functionality which the legacy network printers would not otherwise support.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 4 is a table diagram depicting a target descriptor table according to one embodiment of the present invention.

FIG. 8A is a block diagram depicting an IN rules table according to one embodiment of the present invention.

FIG. 8B is a block diagram depicting an OUT rules table according to one embodiment of the present invention.

FIG. 11 is a block diagram depicting a routing table according to one embodiment of the present invention.

DETAILED DESCRIPTION OF THE PREFERRED EMBODIMENTS

The invention is directed to a mimic device for use in a general network environment in order to augment the functionality of existing network devices. In particular, the mimic device of the present invention utilizes two separate network interface cards in order to allow the mimic device to act as a middle man between the general network which is connected to one of the network interface cards in the mimic device, and a local network which is connected to the second of the network interface cards in the mimic device. In this manner, a number of existing legacy network devices, such as network printers, can be isolated on the local network behind the mimic device from the general, external network. The mimic device can then initially pass through all network traffic from the external network from the first network interface card to the legacy network devices on the local network via the second network interface card. The mimic device listens to the local network and discovers all of the legacy network devices thereon, after which the mimic device can utilize applications within the mimic device to augment the functional capabilities of each discovered legacy network device.

The applications are provided in the mimic device to augment the legacy network devices in order to add functional capabilities on their behalf. For example, if a network printer on the local network behind the mimic device does not have e-mail printing capability, the mimic device can contain an e-mail printing application, whereupon the mimic device intercepts requests from a client on the external network for e-mail printing from a network printer on the local network and then performs the e-mail printing function on behalf of the network printer by sending a rendered print job to the network printer in response to the request from the client. In this example, the mimic device responds to the client on the external network using the IP address of the network printer so that the presence of the mimic device is transparent to the client. In addition, the mimic device can support a connection to a client on the external network which is initiated by a legacy network device on the local network. For example, a legacy network device my send a network time protocol (NTP) request which is directed to an NTP server on the external network. The mimic device could intercept the NTP request and then send its own NTP request to the NTP server on behalf of the legacy network device. The mimic device would then receive a response from the NTP server, such as the current time, and then forward the response to the legacy network device, using either the IP address of the mimic device or the IP address of the NTP server as the source IP address. Accordingly, the mimic device provides an efficient and inexpensive way to augment functional capabilities of legacy network devices in a manner which is transparent to network users on the external network.

Figure 1:
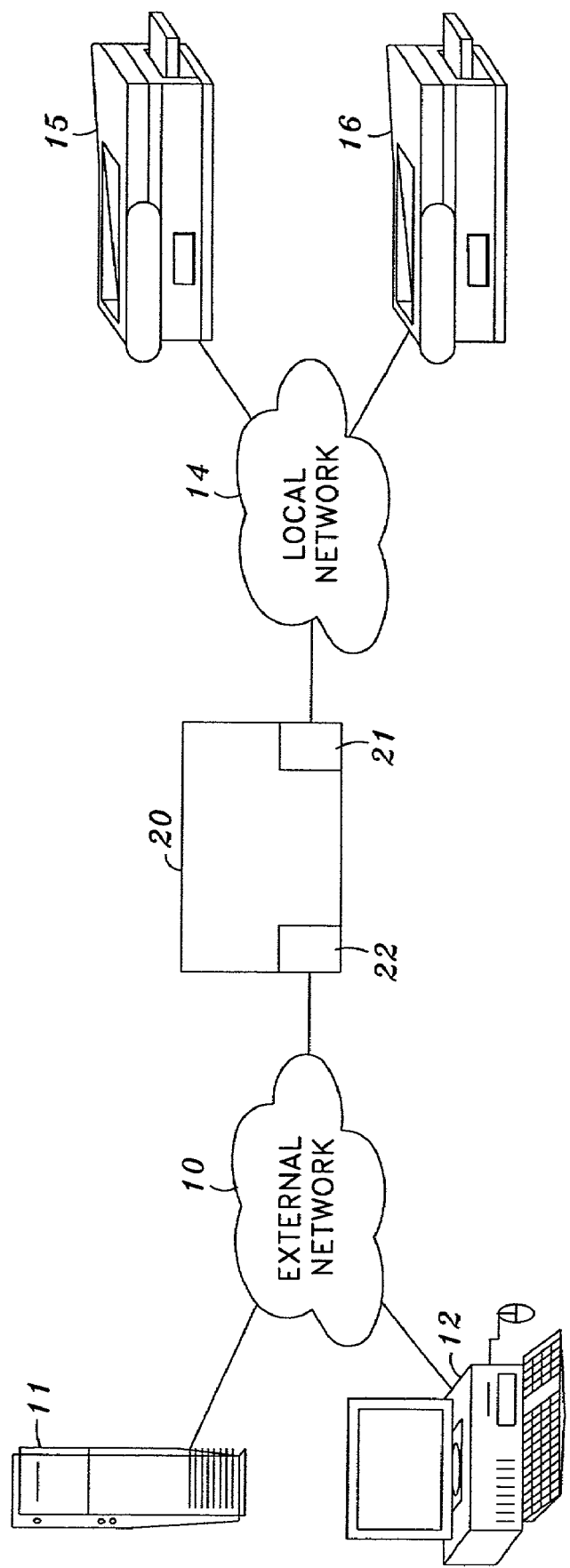
FIG. 1 is a depiction of a network environment in which the present invention may be practiced.

FIG. 1 depicts a network environment in which the present invention may be practiced. As seen in FIG. 1, external network 10 is a typical network which is preferably supported by TCP/IP and other common network protocols which are discussed further herein. Connected to external network 10 are server 11, which is a typical network server, and workstation 12. Workstation 12 is a typical computing workstation having a host processor with a CPU, fixed disk and RAM, and a display, keyboard and mouse for interacting with the host processor. Server 11 is a typical server having a host processor which includes a CPU, RAM, ROM and a large fixed disk for containing files and/or applications which can be accessed and shared by users on external network 10.

As seen in FIG. 1, mimic device 20 has external network interface card 22 and local network interface card 21. As mentioned above, this allows mimic device 20 to act as a controlled bridge between external network 10 and local network 14. External network interface card 22 connects mimic device 20 to external network 10 and local network interface card 21 connects mimic device 20 to local network 14. A plurality of network devices can be residing on local network 14 for communication with mimic device 20. In the example shown in FIG. 1, legacy network printers 15 and 16 are provided on local network 14 and are therefore in connection with mimic device 20 via local network interface card 21. In addition, it can be appreciated that the mimic device can also be used as a bridge to connect non-internet capable network devices to external network 10. For example, local network 14 could be a USB network, and legacy network printers 15 and 16 could be non-network capable printers. Accordingly, mimic device 20 would act as a bridge between printers 15 and 16 via the USB connection of local network 14 to external network 10.

Each of legacy network printers 15 and 16 has a network interface card (not shown) for connection to local network 14. Legacy network printers 15 and 16 may be typical network printers, such as laser jet printers or ink jet printers, and have certain limited functional capabilities to support network printing applications. For purposes of explaining the present invention, legacy network printers 15 and 16 are assumed to lack certain enterprise printing functional capabilities, such as secure printing, e-mail printing, or some other printer functionality. For this reason, legacy network printers 15 and 16 are isolated from external network 10 by being placed on local network 14 such that mimic device 20 can provide additional enterprise printing functional capabilities on behalf of legacy network printers 15 and 16. It should be appreciated that mimic device 20 can be utilized to augment functional capabilities of any network device on local network 14 and is not limited to use with network printers only.

Figure 2A:
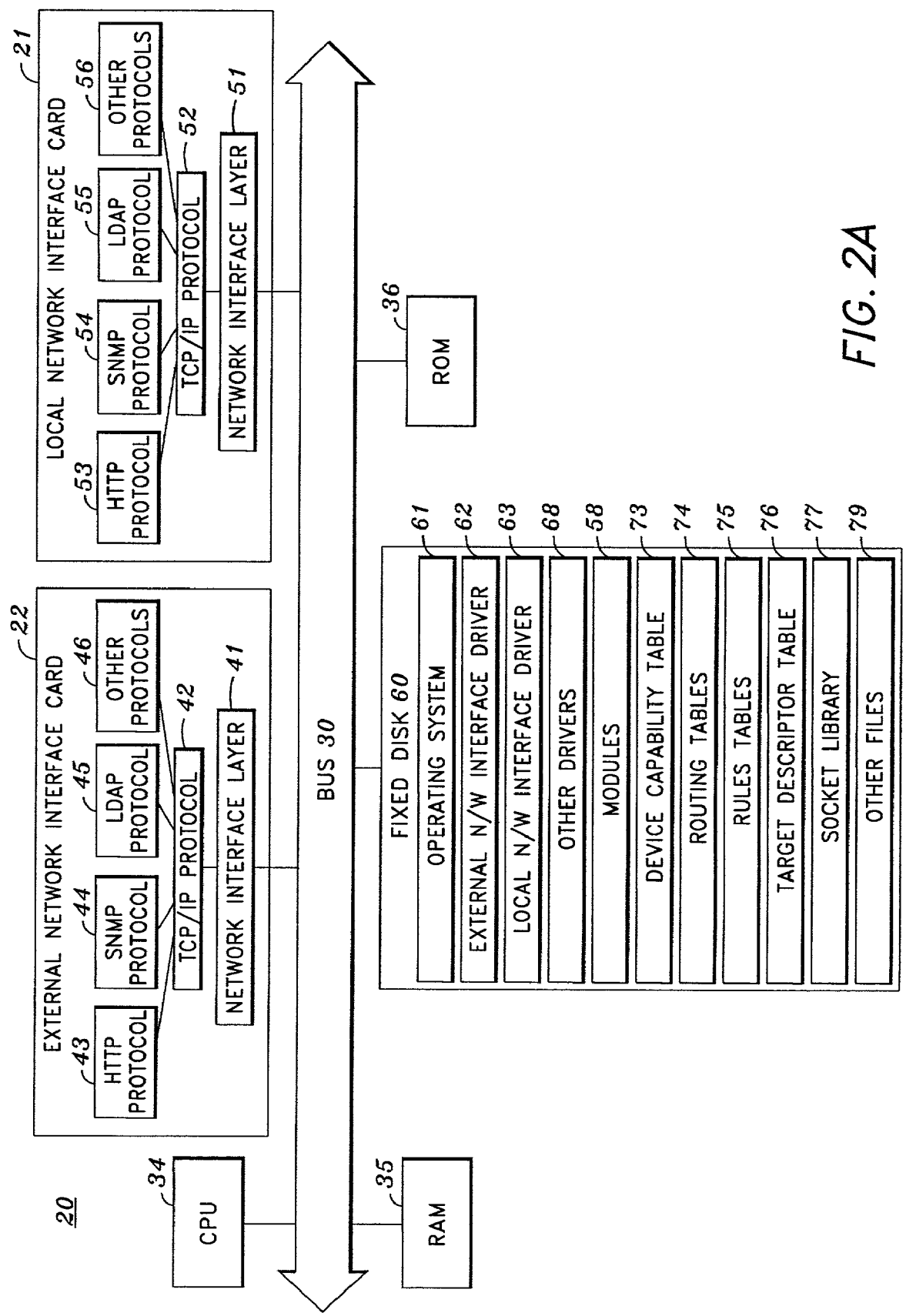
FIG. 2A is a block diagram illustrating an internal architecture of a mimic device according to one embodiment of the present invention.

FIG. 2A is a block diagram for explaining the internal architecture of mimic device 20. As seen in FIG. 2A, mimic device 20 essentially has the configuration of a server or other similar computing device, with the exception that mimic device 20 includes two network interface cards. Mimic device 20 includes system bus 30, CPU 34, RAM 35, ROM 36, external network interface card 22, local network interface card 21 and fixed disk 60.

Central processing unit (CPU) 34 is a programmable microprocessor which is interfaced to bus 30. Random access memory (RAM) 35 is interfaced to bus 30 in order to provide CPU 34 with access to memory storage, thereby acting as the main run-time memory for CPU 34. In particular, when executing stored program instruction sequences, CPU 34 loads the instruction sequences from fixed disk 60 (or other connected memory media) into RAM 35 and then executes those stored program instruction sequences out of RAM 35. It should also be recognized that standard disk-swapping techniques allow segments of memory to be swapped to and from RAM 35 and fixed disk 60.

Read only memory (ROM) 36 stores invariant instruction sequences, such as startup instruction sequences for CPU 34 or such as basic input/output operating system ("BIOS") sequences for the operation of any peripheral devices which may be connected to mimic device 20 (not shown). External network interface card 22 and local network interface card 21 are two separate and distinct network interfaces, thereby allowing mimic device 20 to connect to external network 10 through external network interface card 22 and also to local network 14 through local network interface card 21. As seen in FIG. 2, both external network interface card 22 and local network interface card 21 contain similar protocol stacks for interfacing external network 10 and local network 14, respectively, to mimic device 20. It should be noted that the protocol stacks in local network interface card 21 and in external network interface card 22 do not have to be similar. For example, local network 14 could be using a protocol different from external network 10, such as a token ring protocol, such that the protocol stack in local network interface card 21 would include a protocol layer to support the token ring protocol environment instead of an IP protocol environment.

For example, external network interface card 22 contains network interface layer 41 which is a low-level protocol layer to interface directly with external network 10. TCP/IP layer 42 is provided above network interface layer 41 for supporting communication via the TCP/IP protocol over external network 10. In this manner, mimic device 20 can send and receive TCP/IP messages, often referred to as "frames", over external network 10. In a similar manner, HTTP layer 43, SNMP layer 44, LDAP layer 45 and other layers 46 are provided above TCP/IP layer 42 to support communications over external network 10 using HTTP, SNMP, LDAP and other known networking protocols, respectively. As mentioned above, the protocol stack shown in local network interface card 21 is similar to that of the protocol stack discussed above and therefore will not be explained in detail.

Fixed disk 60 is one example of a computer-readable medium that stores program instruction sequences executable by CPU 34 so as to constitute operating system 61, external network interface driver 62, local network interface driver 63, other drivers 68, modules 58, device capability table 73, routing tables 74, rules tables 75, target descriptor table 76, socket library 77 and other files 79.

Operating system 61 can be a basic operating system such as DOS or UNIX, or can be a common windowing operating system such as Windows NT, or another known operating system. External network interface driver 62 is utilized to drive external network interface card 22 for interfacing mimic device 20 to external network 10. In a similar fashion, local network interface driver 63 is utilized to drive local network interface card 21 for interfacing mimic device 20 to local network 14. Other drivers 68 can be utilized to drive other devices which may be connected to mimic device 20 (not shown) such as a front panel interface for allowing a user to configure and operate mimic device 20, or such as a display monitor, key pad and mouse (not shown) for achieving the same purpose. Modules 58 are utilized to implement the functionality of the present invention and are described more fully below.

Device capability table 73 is utilized to store information regarding the functional capabilities of a range of network devices which may be provided on local network 14 and is utilized to implement the present invention as discussed further below. Routing tables 74 comprises one or more routing tables which are used to route outgoing communications from mimic device 20 over external network interface card 22 or over local network interface card 21 and is described in greater detail below. Rules tables 75 is utilized to implement the functionality of the present invention and is described in more detail below. Target descriptor table 76 is utilized to contain a plurality of target descriptor entries corresponding to the legacy network devices discovered by mimic device 20 on local network 14 and is discussed further below. Socket library 77 is a library used in the present invention to track sockets which are opened up by applications in the mimic device according to the present invention. Lastly, other files 79 contains other files and/or programs necessary to operate mimic device 20 and to provide additional functionality to mimic device 20.

Figure 2B:
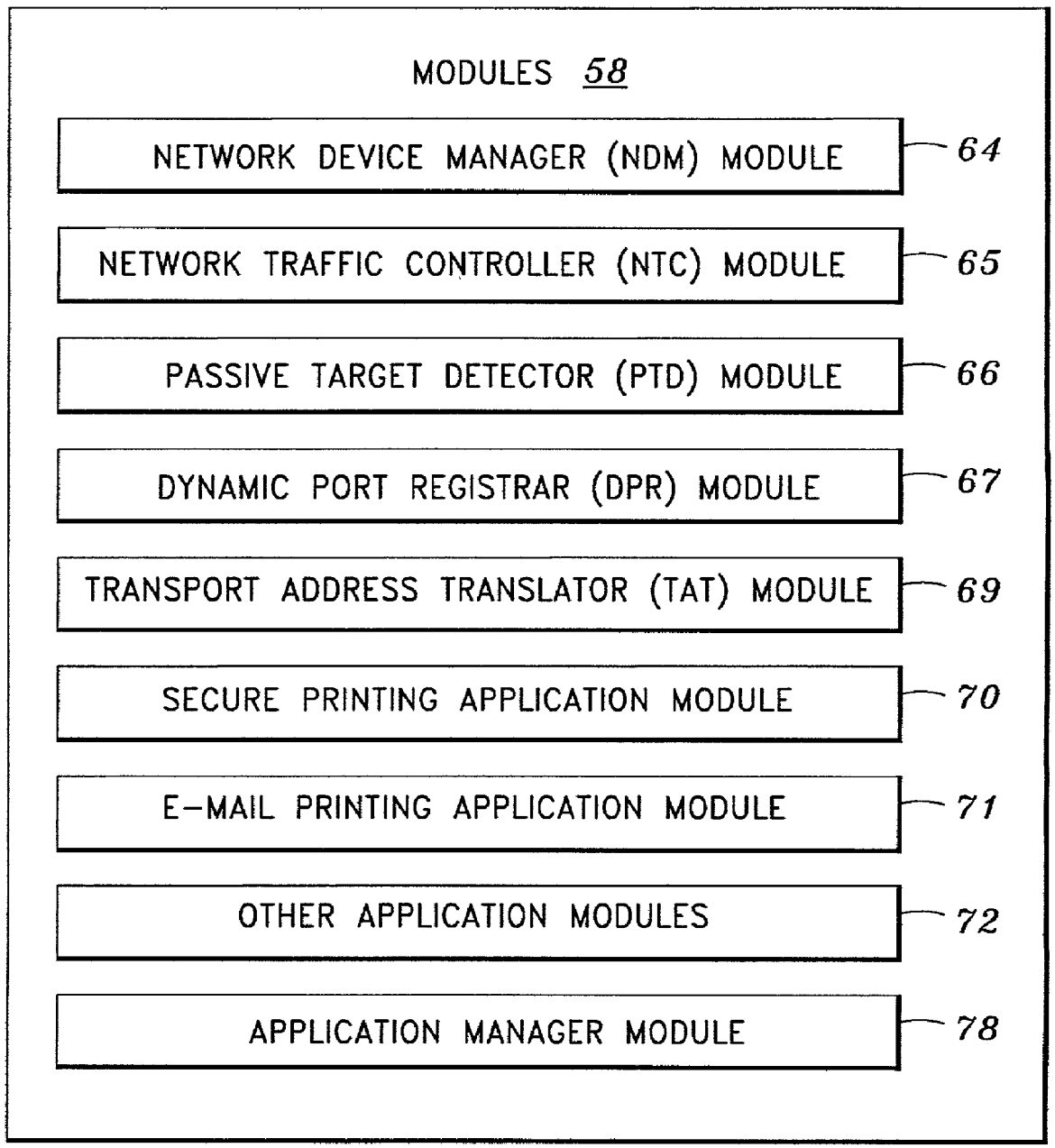
FIG. 2B is a block diagram illustrating the modules contained in the fixed disk of the mimic device depicted in FIG. 2A according to one embodiment of the present invention.

FIG. 2B is a block diagram showing each of the modules in modules 58. Turning to FIG. 2B, it can be seen that modules 58 includes network device manager (NDM) module 64, network traffic controller (NTC) module 65, passive target detector (PTD) module 66, dynamic port registrar (DPR) module 67, transport address translator (TAT) module 69, secure printing application module 70, e-mail printing application module 71, other application modules 72 and application manager module 78. All of the aforementioned modules are specific to implementation of the present invention and will be briefly described here with respect to FIG. 2B, and will be described in more detail below with respect to the other figures.

Network device manager module 64 is a low-level module utilized to implement the present invention for receiving and sending messages, known as frames, to and from each of external network interface card 22 and local network interface card 21. Network traffic controller module 65 is utilized to implement the present invention and determines, in conjunction with rules from rules tables 75, whether certain messages should be handled by mimic device 20 on behalf of one of the legacy network devices on local network 14, or should simply be passed through to the corresponding legacy network device on local network 14. Passive target detector module 66 is utilized to implement the present invention and essentially discovers the legacy network devices residing on local network 14 by obtaining network-related and other functional information with respect to each discovered legacy network device. Passive target detector (PTD) module 66 also performs periodic polling for confirming the status of each discovered legacy network device.

Dynamic port registrar module 67 is utilized to implement the present invention by monitoring ports opened up by applications within mimic device 20 and to create rules for redirecting messages (frames) to the corresponding applications, as needed, so that the applications may act on behalf of one or more legacy network devices on local network 14. Transport address translator module 69 is utilized to implement the present invention by monitoring sockets opened by the legacy network devices on local network 14 and to map the corresponding socket identifiers to newly-created socket identifiers in order to avoid socket identifier conflicts with the sockets which are opened by applications in mimic device 20.

Secure printing application module 70 and e-mail printing application module 71 are examples of application modules which can be provided in mimic device 20 in order to augment the functional capability of legacy network printers 15 and 16, or other legacy network devices, on local network 14. For example, legacy network printer 15 may have the functional capability to support e-mail printing, but may not have the functional capability to support secure printing. In this regard, mimic device 20 would utilize secure printing application module 70 to respond to frames received from external network 10 which requests secure printing services from legacy network printer 15. In a similar fashion, if legacy network printer 16 does not support e-mail printing, mimic device 20 would utilize e-mail printing application module 71 to act on behalf of legacy network printer 16 for incoming requests from external network 10 for e-mail printing services from legacy network printer 16. In this manner, it appears to clients on external network 10, such as workstation 12, that each of legacy network printers 15 and 16 has the capability to support secure printing and e-mail printing when in fact mimic device 20 is providing such additional functional capabilities on behalf of the printers in a transparent manner. Other application modules 72 is utilized to support other additional applications to augment the functional capabilities of legacy network devices residing on local network 14. Lastly, application manager module 78 is utilized by the present invention to initiate one or more of the aforementioned applications as needed to augment the functional capabilities of each legacy network device. These modules will be discussed in greater detail below with respect to the remaining figures.

Figure 3:
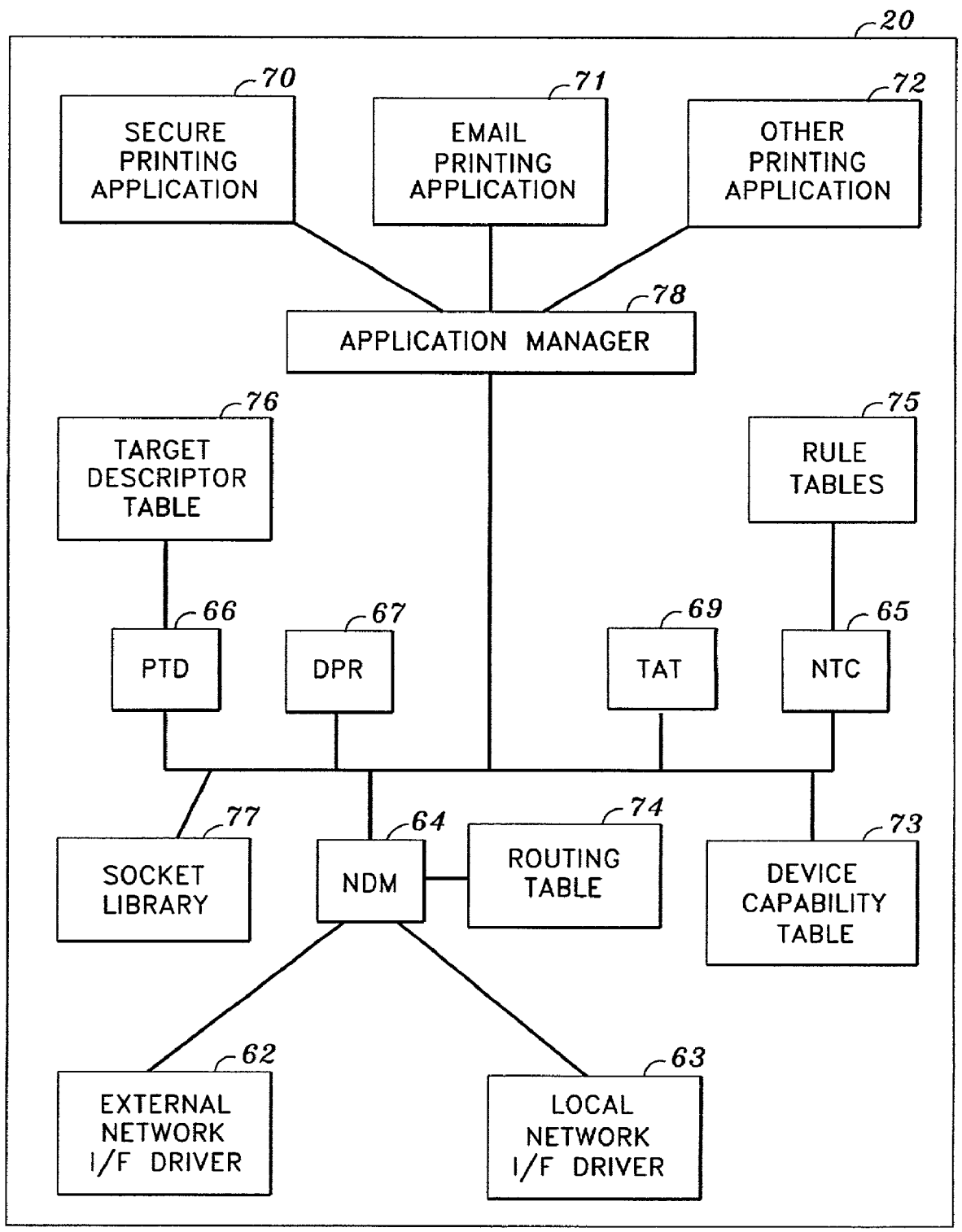
FIG. 3 is a block diagram depicting the functional components of a mimic device according to one embodiment of the present invention.

FIG. 3 is a diagram depicting the functional modules of mimic device 20. NDM 64 manages device drivers utilized by mimic device 20 such as external network interface driver 62, local network interface driver 63 and drivers associated with devices supported by mimic device 20 connected to local network 14. External network interface driver 62 facilitates sending and receiving packets to and from external network 10. Local network interface driver 63 facilitates sending and receiving packets to and from local network 14. Additionally, NDM 64 maintains routing table 74, which is utilized by NDM 64 for routing packets sent by mimic device 20.

NTC 65 processes frames received by NDM 64 from either external network 10 or local network 14, as well as frames being sent by applications running internally on mimic device 20. NTC 65 processes frames by applying a series of rules to each frame. The rules are contained in rule tables 75, which are managed by NTC 65. PTD 66 detects and monitors devices on local network 14. PTD 66 maintains target descriptor table 76, which contains parameters defining the detected devices, such as printer 15 and printer 16. Additionally, PTD 66 notifies other modules within mimic device 20 of any changes to the detected devices defined in target descriptor table 76.

DPR 67 monitors the opening and closing of sockets by applications running on mimic device 20, and interacts with NTC 65 to ensure that frames processed by NTC 65 are channeled correctly. In monitoring sockets, DPR 67 refers to socket library 77, which contains socket descriptors defining the sockets opened by applications running on mimic device 20. TAT 69 monitors the assignment of port numbers by devices on local network 14, and when necessary prevents conflicts between those devices and applications running on mimic device 20.

Application manager module 78 manages the applications being run on mimic device 20. Upon being notified of a new device by PTD 66, application manager module 78 determines which application should be launched to augment the capabilities of the newly detected device. Possible application modules include secure printing application module 70, which provides secure printing services between a host on external network 10 and a device on local network 14, such as printer 15 or printer 16. Additionally, e-mail printing applications module 71 provides e-mail printing functionality from a host on external network 10 to a device on local network 14. Additional functionality can be added to mimic device 20 by including other applications to provide needed services. Future applications are represented in FIG. 3 by other printing application module 72.

The above description of the functional modules has been provided in order to briefly introduce their purposes. A more detailed description of the functioning and interactions of these modules will be provided below.

FIG. 4 is a depiction of target descriptor table 76. Each entry in target descriptor table 76 is defined by several parameters. Target 100 is an identifier corresponding to a detected device on local network 14. Ethernet address 101 provides the ethernet address of the detected device. IP address 102 provides the IP address of the detected device. IP network mask 104 provides the netmask associated with the detected device. Default router 105 provides the address of the default router associated with the detected device. SNMP object identifier 106 provides the SNMP object identifier assigned to the detected device. The creation and maintenance of these entries are performed by PTD 66, and will be described in more detail below.

Figure 5:
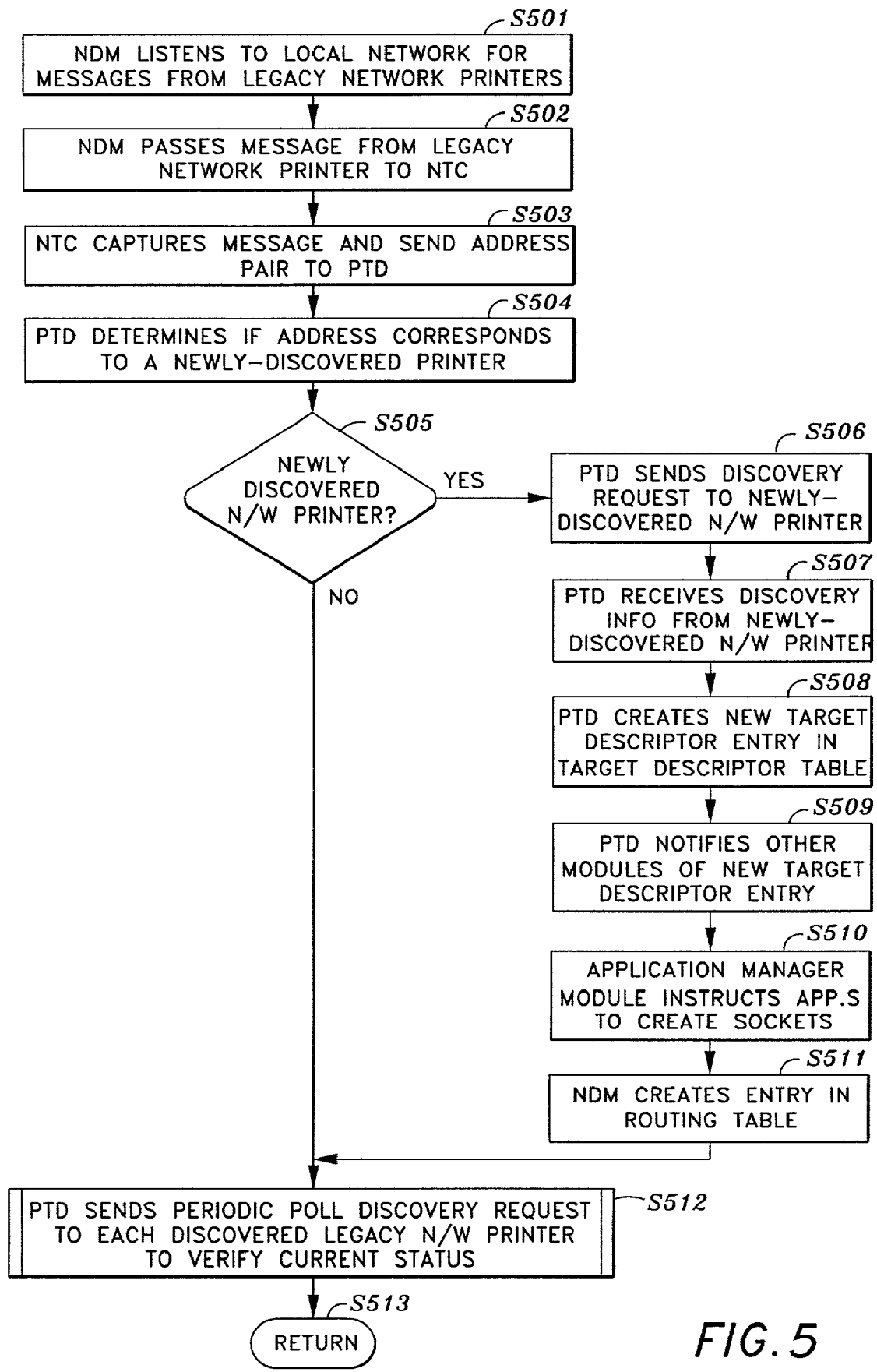
FIG. 5 is a flowchart for explaining a discovery process according to one embodiment of the present invention.

FIG. 5 is a flowchart for describing the discovery process by which mimic device 20 discovers each of the legacy network devices, such as legacy network printers 15 and 16 on local network 14. Turning to FIG. 5, it can be seen in step S501 that NDM 64 listens through local network interface card 21 for network messages on local network 14 from any of the legacy network devices, such as legacy network printers 15 and 16 on local network 14. Specifically, in an ethernet environment supporting TCP/IP, NDM 64 listens for frames from any device on local network 14. In this manner, when a network printer on local network 14 sends a TCP/IP frame containing its source IP address, NDM 64 captures the frame. It should be recognized that NDM 64 is indiscriminate in this function in that it simply passes frames to NTC 65 corresponding to all network messages which it detects over both external network 10 and local network 14. In particular, NDM 64 interfaces with external network interface driver 62 and local network interface driver 63 to receive frames from external network 10 and local network 14, respectively.

Next, once NDM 64 has detected a frame on local network 14, it passes the frame up to NTC 65 in step S502. Preferably, when PTD 66 is initialized, it creates a general capture rule which is placed in rules tables 75 for instructing NTC 65 to capture all frames that are passed to it which have been sent over local network 14 from a legacy network device having a source IP address within a given predetermined range. Accordingly, in step S503, NTC 65 examines the frame passed to it from NDM 64 to determine if the frame contains a source IP address within the IP address range in the broad capture rule. If so, NTC 65 captures the frame and sends the address pair from the frame, consisting of the source IP address and the ethernet address corresponding to local network 14, to PTD 66 (step S503).

In step S504, PTD 66 examines target descriptor table 76 to determine if the address pair passed to it from NTC 65 contains a source IP address which does not yet have a target descriptor entry in target descriptor table 76. If no such entry exists, PTD 66 identifies the source IP address from the address pair as corresponding to a newly-discovered legacy network printer (step S504). In step S505, PTD 66 queries whether it has been determined that the source IP address of the address pair corresponds to a newly-discovered legacy network printer and, if not, flow passes to step S512. If, however, the source IP address in the address pair corresponds to a newly-discovered legacy network printer, flow passes to step S506 in which PTD 66 sends an SNMP discovery request over local network 14 to the newly-discovered legacy network printer corresponding to the source IP address from the address pair. It should be noted that SNMP is only one example of a protocol for supporting the discovery message sent from mimic device 20 the legacy network devices on local network 14. For example, other known protocols could be used for the discovery message, such as lightweight directory access protocol (LDAP), or a proprietary protocol could be used. Preferably, PTD 66 also prepares at this point a basic target descriptor entry for input into target descriptor table 76 wherein the entry contains the source IP address and the ethernet address from the address pair.

As explained above with respect to FIG. 3, the SNMP discovery request sent from PTD 66 is passed to NDM 64 which determines from routing table 74 that the SNMP discovery request message should be sent through local network interface card 21 and over local network 14 to the corresponding newly-discovered legacy network printer.

In step S507, PTD 66 receives SNMP discovery information from the newly-discovered legacy network printer via NDM 64 and NTC 65. Preferably, the SNMP discovery information from the newly-discovered legacy network printer includes an IP network mask, a default router, and an SNMP device ID. The SNMP device ID for the corresponding newly-discovered legacy network printer allows mimic device 20 to determine the make and model and the existing functional capabilities of the newly-discovered legacy network printer. For this reason, device capability table 73 provides a cross-reference between a given SNMP device ID and the corresponding make, model, functional information and other related information for the network printer corresponding to the SNMP device ID.

In step S508, PTD 66 creates a new target descriptor entry in target descriptor table 76 based on the SNMP discovery information received by PTD 66 from the newly-discovered legacy network printer. As mentioned earlier, PTD 66 has preferably already set up a basic target descriptor entry containing the IP address and ethernet address of the newly-discovered legacy network printer. PTD 66 fills in the remaining fields of the target descriptor entry corresponding to the newly-discovered legacy network printer with the received SNMP discovery information. In this manner, a target descriptor entry now exists in target descriptor table 76 corresponding to each discovered legacy network device, such as legacy network printers 15 and 16, on local network 14. The target descriptor entry contains the address information necessary to reach each discovered legacy network device and also contains a corresponding SNMP device ID from which information related to the identity and functional capabilities of the legacy network device can be derived.

In step S509, PTD 66 notifies other modules in mimic device 20 that a new target descriptor entry has been entered in target descriptor table 76. Preferably, PTD 66 performs this notification by publishing the new target descriptor entry to all modules in mimic device 20 which have previously subscribed with PTD 66 to be notified of such an event. For example, application manager module 78 subscribes to PTD 66 upon initialization of application manager module 78 to receive each target descriptor entry that is created and entered in target descriptor table 76. In this manner, application manager module 78 can be made aware of newly-discovered legacy network devices on local network 14 in order to initiate the necessary applications which are needed to augment the functional capabilities of the newly-discovered legacy network device. For example, if PTD 66 determines that legacy network printer 15 is a newly-discovered device, then PTD 66 creates a new target descriptor entry after performing the aforementioned SNMP discovery and then notifies application manager module 78 of the new target descriptor entry corresponding to legacy network printer 15. In this example, application manager module 78 then initiates the applications which are necessary to augment the functional capabilities of legacy network printer 15 which are determined from device capability table 73. If legacy network printer 15 does not inherently support e-mail printing capabilities, application manager module 78 instructs e-mail printing application module 71 to perform this service on behalf of legacy network printer 15 (step S510). Preferably, each application in mimic device 20 which acts on behalf of a given legacy network device opens a socket for receiving frames on behalf of that device. The details of this aspect of the invention are discussed further below with reference to other figures.

Next, in step S511, NDM 64 creates a new entry in routing table 74 based on the address pair comprised of the IP address and ethernet address of the newly-discovered legacy network printer. In this manner, when NDM 64 subsequently receives an outgoing frame containing a destination address corresponding to the IP address of the discovered legacy network printer, NDM 64 will determine based on routing table 74 that the frame should be sent through local network interface card 21 over local network 14 to the discovered legacy network printer corresponding to the IP address. In step S512, PTD 66 sends a periodic poll discovery message to each legacy network printer which has been discovered and has a target descriptor entry in target descriptor table 76 in order to verify the current status of each discovered legacy network printer. The details of this step are discussed further with respect to FIG. 6. Flow then passes to return in step S513.

Figure 6:
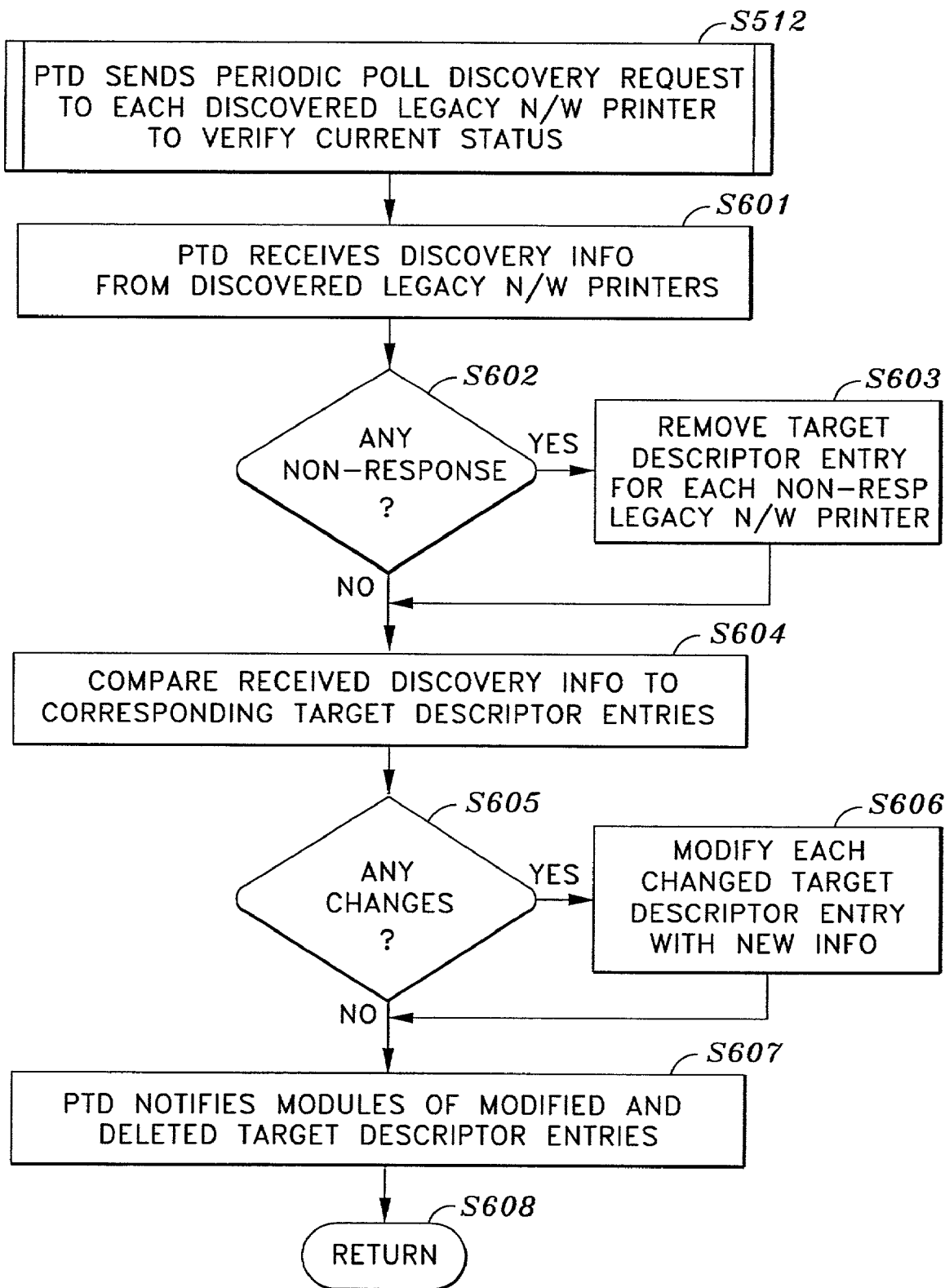
FIG. 6 is a flowchart for explaining a periodic polling discovery process according to one embodiment of the present invention.

FIG. 6 is a flowchart for explaining the periodic polling discovery which is performed in step S512 of the flowchart of FIG. 5. First, in step S512, PTD 66 sends a periodic SNMP discovery request to each legacy network device, such as legacy network printers 15 and 16, which have target descriptor entries in target descriptor table 76. The SNMP discovery request is the same as that discussed above with regard to the initial discovery of each legacy network device on local network 14. Next, in step S601, PTD 66 receives SNMP discovery information from each legacy network device, such as legacy network printers 15 and 16, which respond to the periodic discovery request (step S601). In step S602, PTD 66 determines whether there has been a non-response for any of the legacy network devices which have been sent a periodic SNMP discovery request. If there has been a non-response, the target descriptor entry corresponding to the legacy network device which did not respond is removed from target descriptor table 76 (step S603). Preferably, PTD 66 sets an expiration timer corresponding to each target descriptor entry in target descriptor table 76 when the corresponding target descriptor entry is created or verified as the result of periodic discovery polling.

If a non-response occurs, PTD 66 simply does not update the expiration timer corresponding to the target descriptor entry for the non-responding legacy network device. A service then preferably periodically cleans out target descriptor table 76 of all target descriptor entries having expired expiration timers. In this manner, the appropriate target descriptor entries in target descriptor table 76 are removed when their corresponding legacy network devices fail to respond to periodic discovery polling. Next, in step S604, the SNMP discovery information received from each responding legacy network device in response to the periodic discovery request is compared to the data in each corresponding target descriptor entry in target descriptor table 76. In step S605, it is determined for each responding legacy network device whether the data in the corresponding target descriptor entry has changed based on the received SNMP discovery information in response to the periodic SNMP discovery request. If the information has changed, flow passes to step S606 in which the target descriptor entry for the corresponding legacy network device is modified with the new information received in the SNMP discovery information from the legacy network device in response to the periodic SNMP discovery request. In step S607, PTD 66 notifies other modules in mimic device 20 of each modified and deleted target descriptor entry. This notification is performed as discussed above whereby the aforementioned changed target descriptor entries are published to each module in mimic device 20 which has previously subscribed with PTD 66 to receive such notification. Flow then passes to return in step S608.

Figure 7:
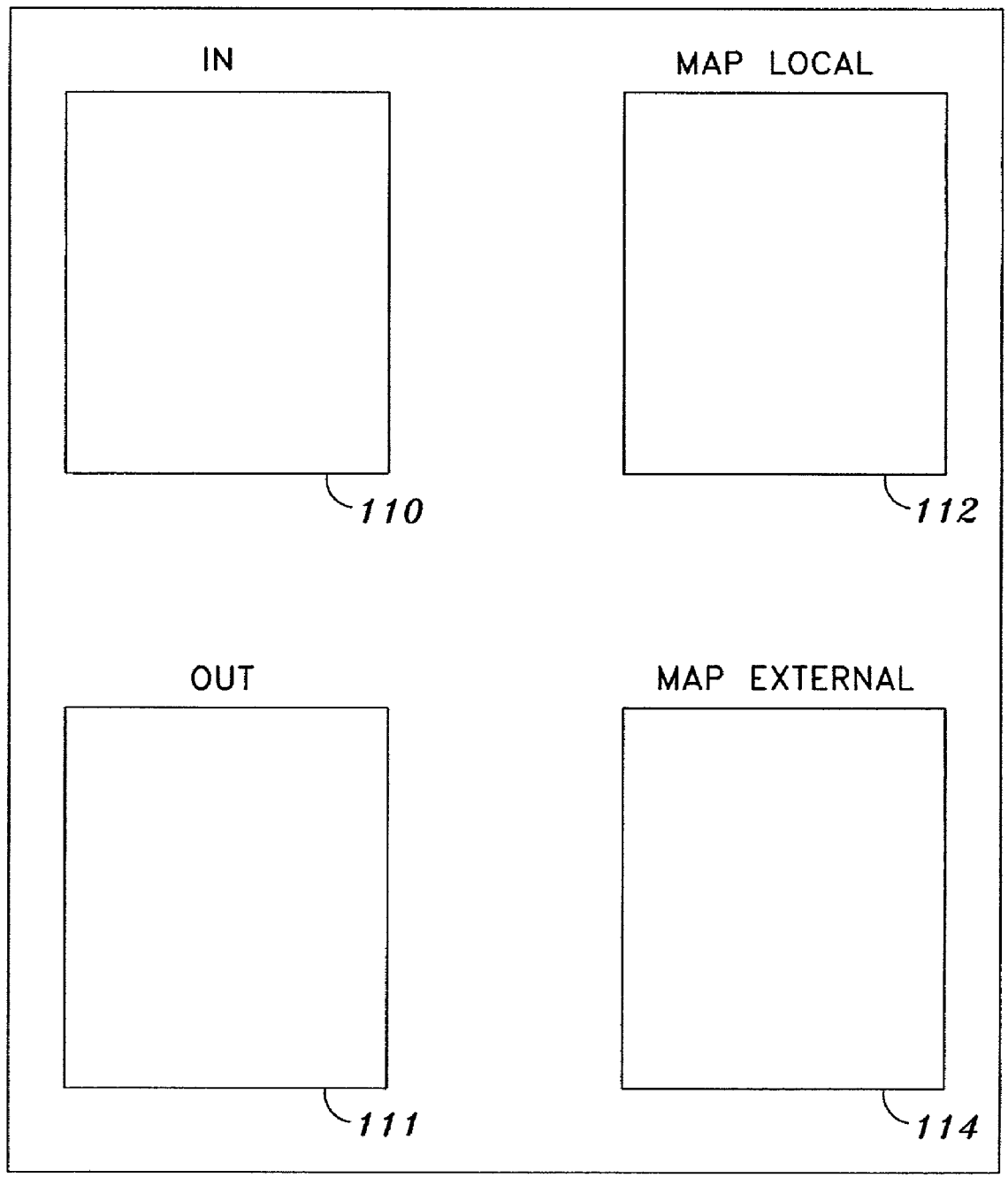
FIG. 7 is a block diagram depicting rules tables according to one embodiment of the present invention.

FIG. 7 is a diagram depicting rule tables 75. Rule Tables 75 contains several tables of rules utilized by NTC 65 in processing frames received and sent by mimic device 20. In this embodiment four rule tables are defined in rule tables 75, however additional rule tables may exist in other embodiments. IN table 110 contains rules that are applied to frames by NTC 65 when they are received by mimic device 20. OUT table 111 contains rules that are applied by NTC 65 to frames prior to sending them to NDM 64 to be sent out of mimic device 20. MAP LOCAL table 112 is a sub-table contained within IN table 110, and is utilized by TAT 69 for managing port assignments. MAP EXTERNAL table 114 is a sub-table contained within OUT table 111, and is also utilized by TAT 69 for managing port assignments.

FIG. 8A depicts IN table 110 together with three sample table entries. Each entry defines a rule based on several parameters to be used by NTC 65 in processing frames. The parameter table 120 identifies the table the rule is found on. Possible tables include IN table 110 and OUT table 111, as well as any subtables such as MAP LOCAL table 112. Parameter timeout 121 can provide a time duration, the expiration of which causes the rule to be removed from the table. In the alternative, parameter timeout 121 could be set as STATIC, which provides for the particular rule to remain on the table until a functional module requests its removal.

Each rule is also defined by a set of discriminators (source IP 122, destination IP 124, source port 125 and destination port 126) and an action 128. NTC 65 compares frames against the discriminators, and if a match occurs the designated action 128 is executed. In this embodiment four discriminators are defined: source IP 122, destination IP 124, source port 125 and destination port 126. Source IP 122 and source port 125 may contain the IP address and port number of the source of a frame. Destination IP 124 and destination port 126 may contain the IP address and port number of the destination for a frame. The entries for the discriminators may be either a specific value or address (IP address or port number), a wildcard that matches with all possible values (an asterisk), or a macro which matches with a specific range of possible values ([LOCAL], for example, will find a match with any address detected on local network 14). While this embodiment utilizes four discriminators, additional discriminators such as protocol and source interface of the frame may also be used.

Upon finding a match between a frame and the discriminators of a rule, the designated action 128 is executed. For example, CAPTURE will cause the frame to be captured and submitted for further processing by one of the functional modules, such as PTD 66. BRANCH will cause the frame to be processed using a subtable indicated in the BRANCH action. REDIRECT causes the frame to be sent to one of the application modules within mimic device 20. ACCEPT causes the frame to be passed through mimic device 20 without further processing by mimic device 20. Additional actions may be defined and utilized within mimic device 20 for processing received frames.

FIG. 8B depicts OUT table 111, which is set up in the same manner as IN table 110. The parameters defining each rule entry are the same as described above with respect to FIG. 8A, and are therefore identified with the same designating numbers. Since OUT table 111 is structured in the same manner as IN table 110, a detailed explanation of the structure will be omitted.

Figure 9:
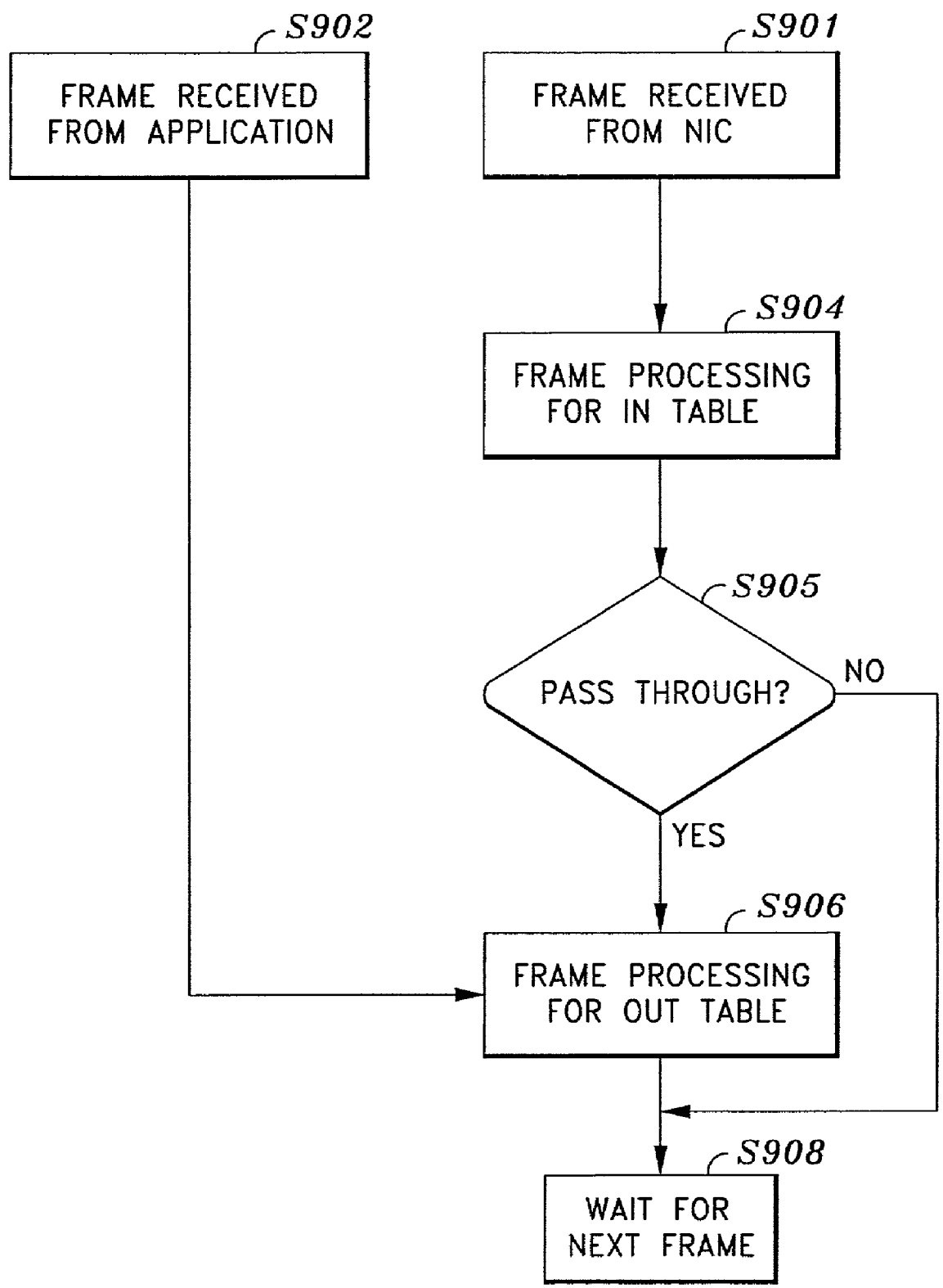
FIG. 9 is a flowchart for explaining the application of a frame to the IN and OUT rules tables depicted in FIGS. 8A and 8B according to one embodiment of the present invention.

FIG. 9 is a flowchart briefly summarizing the processing performed by NTC 65 on frames received by mimic device 20. In step S901, a frame is received by one of the network interfaces such as external network interface 32 or local network interface 31. Upon receiving the message, NDM 64 notifies NTC 65 that the frame is ready for processing. In step S904, the received frame is processed by NTC 65 using the rules contained within IN table 110. If the frame is not dropped or redirected by NTC 65 in applying IN table 110, in step S905 processing of the frame by NTC 65 is shifted and performed in step S906 using the rules contained in OUT table 111. Otherwise, in step S905 processing by NTC 65 is stopped and NTC 65 awaits the next frame in step S908. In step S902, a frame is received by NTC 65 from an application module, such as secure printing application module 70. NTC 65 then proceeds to process the frame using the rules contained within OUT table 111 in step S906. Upon completion of step S906, NTC 65 again waits for the next frame in step S908.

Figure 10:
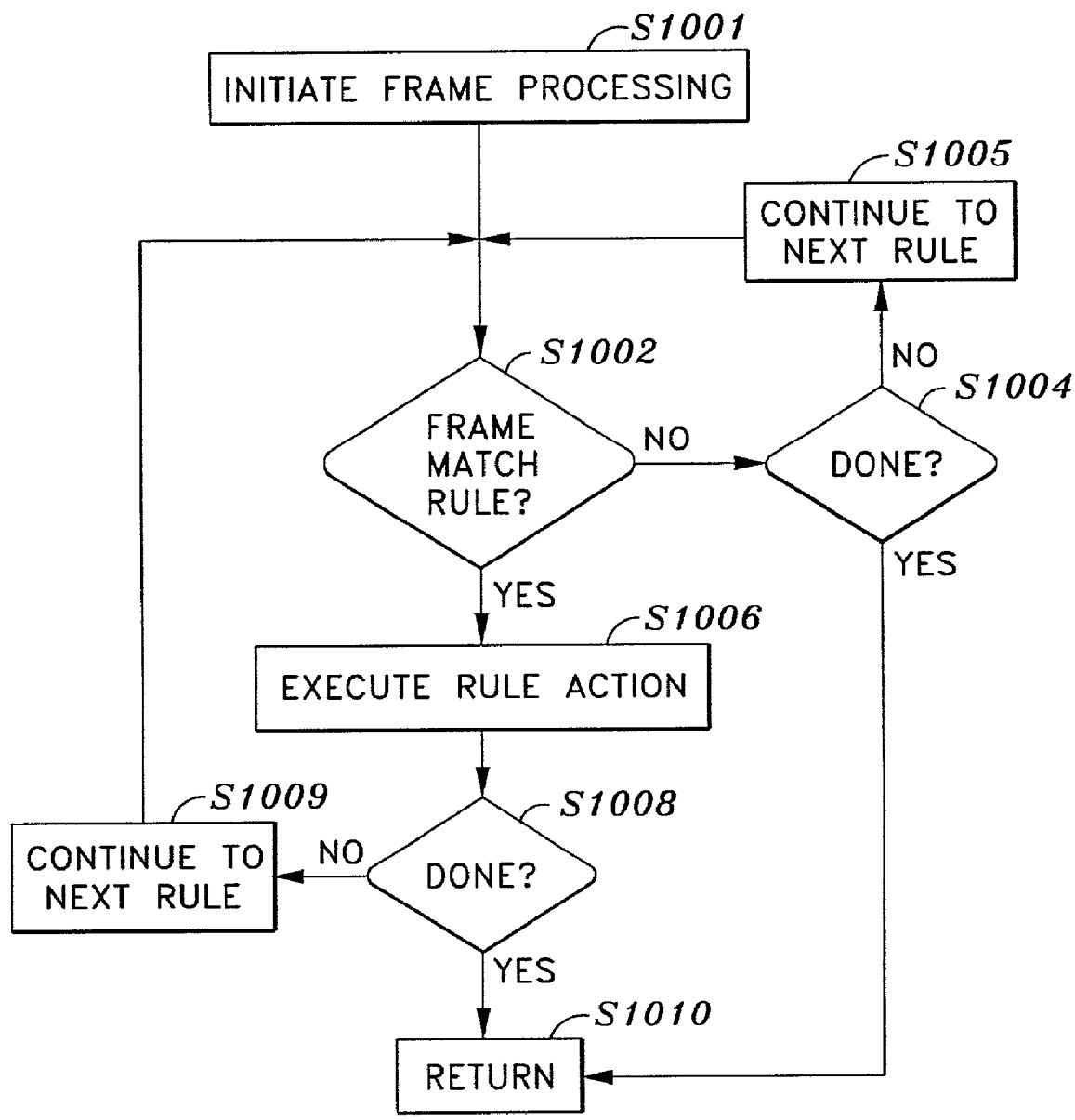
FIG. 10 is a flowchart for explaining the processing of frames according to one embodiment of the present invention.

The description of FIG. 9 above briefly described NTC 65 applying a rule table, such as IN table 110, in processing a frame. FIG. 10 is a flowchart depicting in more detail the process of processing a received frame using rules contained within a particular rule table. In step S1001, NTC 65 initiates processing of the received frame. Typically, initiation occurs when NTC 65 reaches a point in the general processing, such as that depicted in FIG. 9, where a received frame is to be processed using a particular rule table. In step S1002, NTC 65 determines whether the frame matches the discriminators contained within the first rule of the rule table. If these discriminators do not match the frame, in step S1004 it is determined whether NTC 65 is done processing using the rule table. If processing is not done, in step S1005 NTC 65 continues to the next rule in the rule table and returns to step S1002 to determine if the frame matches the discriminators of that rule. However, if NTC 65 is done processing using the rule table, processing is returned to the general processing depicted in FIG. 9 in step S1010.

If NTC 65 determines in step S1002 that the frame does match the discriminators defined in the rule, the action associated with that rule is executed in step S1006. After the action associated with that rule has been executed in step S1006, it is determined in step S1008 whether the processing using the rule table is done. If processing using the rule table is not done, NTC 65 proceeds to the next rule in the rule table in step S1009 and returns to step S1002 to compare the discriminators of that rule with the frame. If processing is complete using the rule table, NTC 65 again returns to general processing in step S1010. Whenever NTC 65 is called upon to process a frame using a particular rule table, NTC 65 traverses the relevant rule table as described above.

FIG. 11 depicts routing Table 74 utilized by NDM 64 in determining which network interface to transmit frames. Each entry in routing Table 74 is defined using several parameters such as destination 140, netmask 141, gateway 142, device 144 and notes 145, which describe the particular entry in the table. The detailed definition and functioning of each of the parameters are well known to those skilled in the art, and therefore are not provided in this description.

Figure 12:
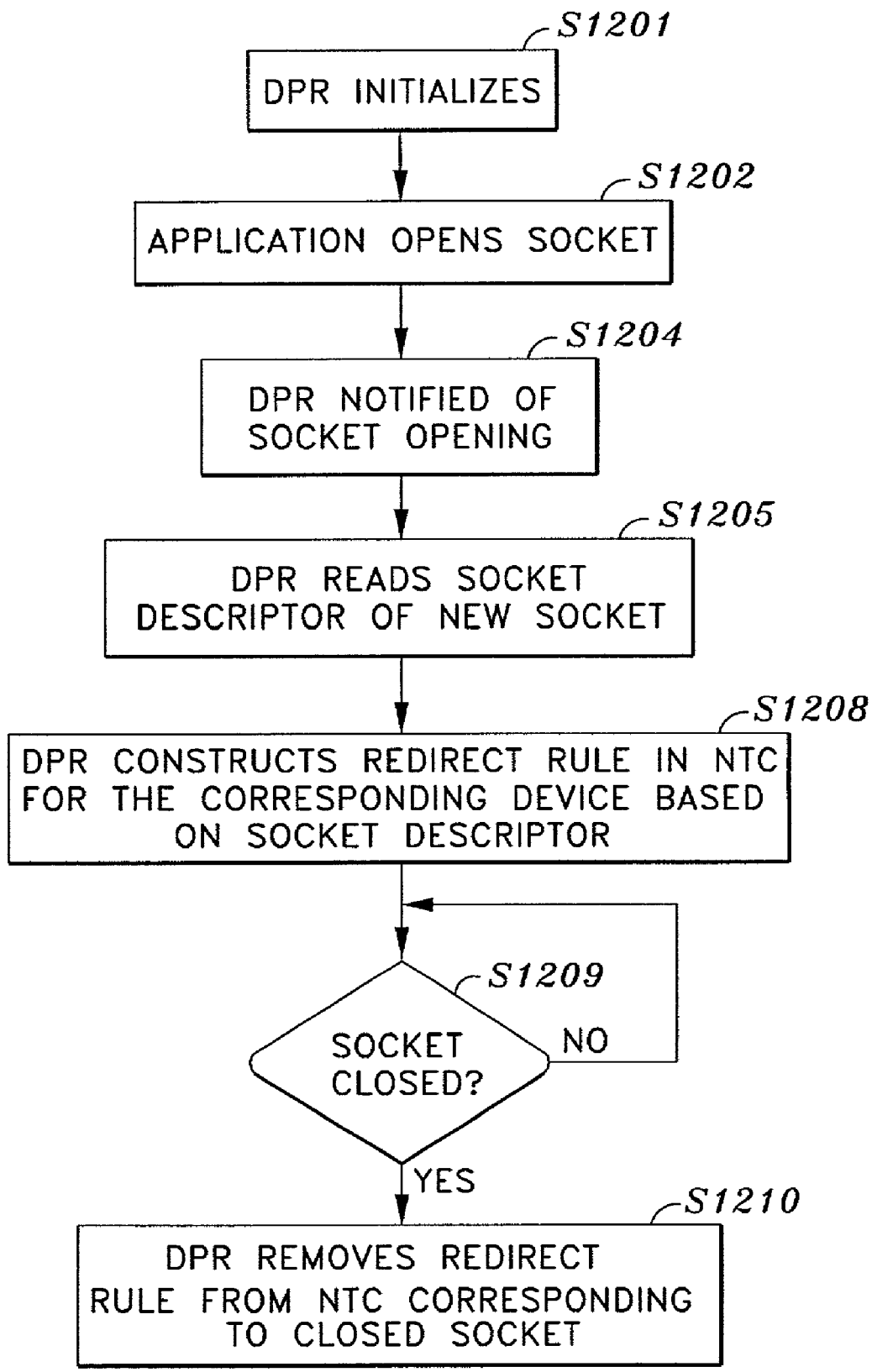
FIG. 12 is a flowchart for explaining dynamic port registration according to one embodiment of the present invention.

FIG. 12 is a flowchart depicting the processing performed by DPR 67. In step S1201, DPR 67 initializes and waits for application modules in mimic device 20 to begin working with sockets. In step S1202 an application such as e-mail printing application module 71, begins executing and creates a socket for communication over the network. When an application opens a socket for communication over the network, a function is called to open the socket. When one of these functions are called, DPR 67 is notified in step S1204 of the socket creation.

When an application opens a socket for communication, an entry is made in socket library 77 containing a socket descriptor for defining the socket opened by the application. In step S1205, DPR 67 reads the socket descriptor from socket library 77 to determine the parameters of the new socket. In step S1208, DPR 67 constructs a redirect rule in NTC 65 based on the socket descriptor corresponding to the new socket. Utilizing this redirect rule, NTC 65 redirects frames received by mimic device 20 to the application running on the mimic device 20 rather than passing the frame through to a device on local network 14.

In step S1209, DPR 67 waits for the socket to be closed. DPR 67 may wait for a function to be called which closes the socket, or in the alternative DPR 67 may wait a specified period of time beginning when the socket is opened. Once the socket has been closed, in step S1210 DPR 67 removes the redirect rule from NTC 65 corresponding to the closed socket. In the manner described above, DPR 67 can ensure that any traffic received from external network 10 is directed to application modules running on mimic device 20 in the case where mimic device 20 is augmenting the capabilities of a device on local network 14.

Figure 13:
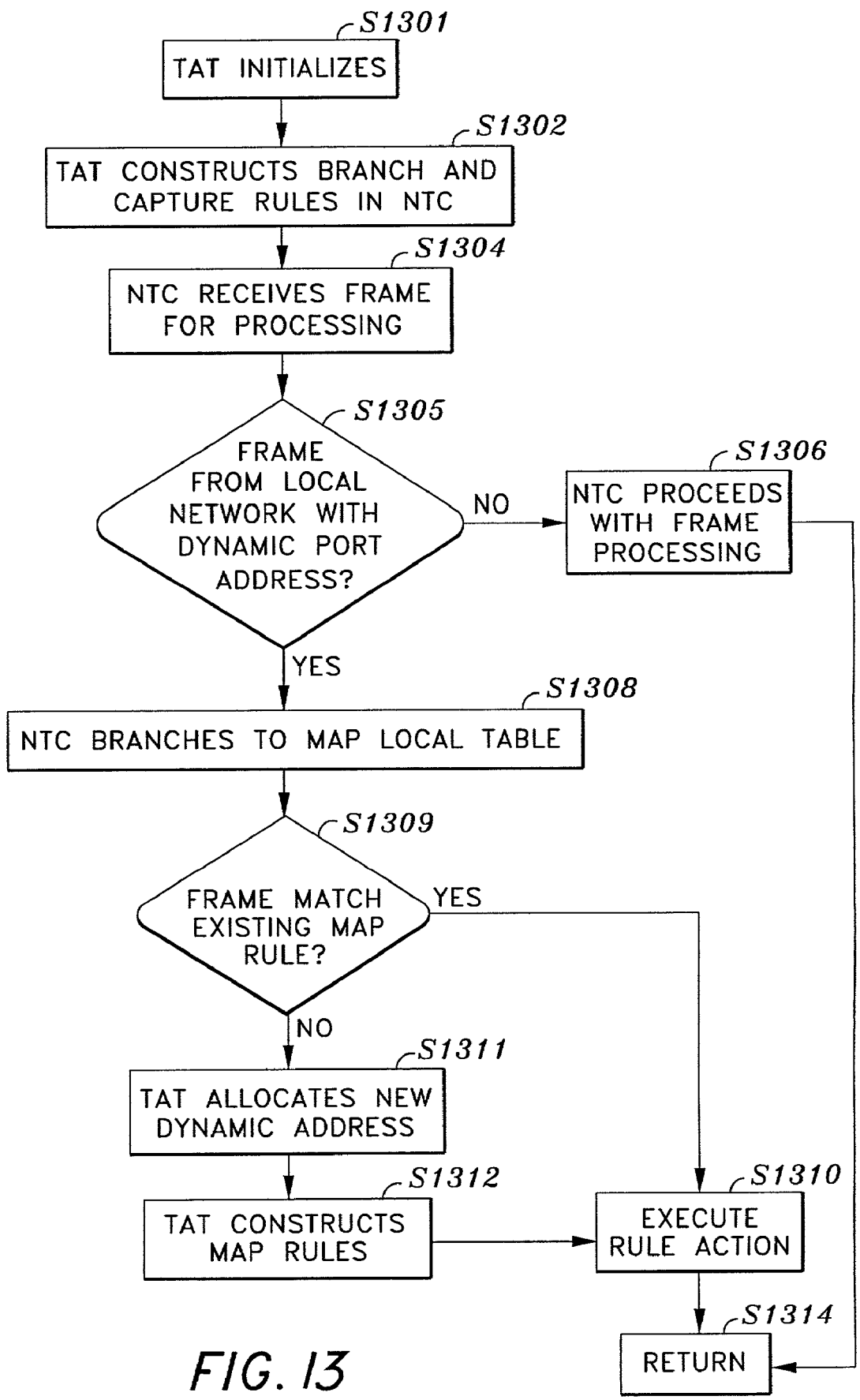
FIG. 13 is a flowchart for explaining the mapping of port identifiers according to one embodiment of the present invention.

FIG. 13 depicts the processing performed by TAT 69. In step S1301, TAT 69 initializes and prepares for processing. In step S1302, TAT 69 constructs branch and capture rules in NTC 65. TAT 69 constructs a branch rule in IN table 110 for directing specific received frames to map local table 112. In addition, TAT 69 constructs a branch rule in OUT table 111 for directing specific frames to map external table 114. Additionally, TAT 69 constructs a capture rule within the map local table 112 to capture specific frames. The capture rule constructed in map local table 112 captures all frames received from devices on local network 14 using a dynamic port address.

In step S1304, NTC 65 receives a frame for processing from NDM 64. In step S1305, it is determined whether the received frame is from the local network and whether it contains a dynamic port address. If it is from the local network and contains a dynamic port address, the branch rule created by TAT 69 branches the frame processing to map local table 112 in step S1308. If the received frame is not from the local network and/or does not contain a dynamic port address, NTC 65 proceeds with normal frame processing in step S1306 and TAT 69 returns to a wait state in step S1314.

As indicated above, NTC 65 branches to map local table 112 in step S1308 when it is determined that the received frame is from a local network with a dynamic port address. In step S1309, NTC 65 traverses map local table 112 and determines whether the frame matches the discriminators of an existing map rule within that table (as well as determining if there is a match with any other rules contained within map local table 112, and executing the rule action for those rules that do match). If there is a match of the discriminators, in step S1310 the map rule is executed and TAT 69 returns to a wait state for the next frame in step S1314. If there is no existing map rule corresponding to the discriminators of the frame, in step S1311 TAT 69 allocates a new dynamic address for that frame.

In assigning the new dynamic address to the frame, TAT 69 may utilize its own internal list of unused port numbers. In the alternative, TAT 69 may create a dummy socket and receive a new port number allocated by the network stack of mimic device 20 and utilize that new dynamic address for the frame being processed. In step S1312, TAT 69 constructs map rules corresponding to the newly assigned dynamic address. In map local table 112, TAT 69 constructs a map rule which maps the existing port address of a frame to the newly allocated port address when a frame is processed containing the original port number. In the map external table 114, TAT 69 constructs a map rule for mapping the newly allocated dynamic address back to the original dynamic port address upon receiving a frame from the external network containing to the new dynamic address. Upon completion of constructing the map rules, the newly created map rule is executed on the present frame being processed in step S1310, and TAT 69 returns to a wait state for the next frame in step S1314.

Preferably, the rules contained within map local table 112 and map external table 114, which are utilized by NTC 65, do not contain terminal actions. Accordingly, TAT 69 processes the frames and then returns processing to NTC 65, thereby transparently performing address translation on frames utilizing dynamic port addresses without interfering with the general processing performed by NTC 65. It should be noted that other sub-tables can be created by any application that requires them. These sub-tables, unlike the sub-tables used by TAT 69, may include terminal actions.

Figure 14:
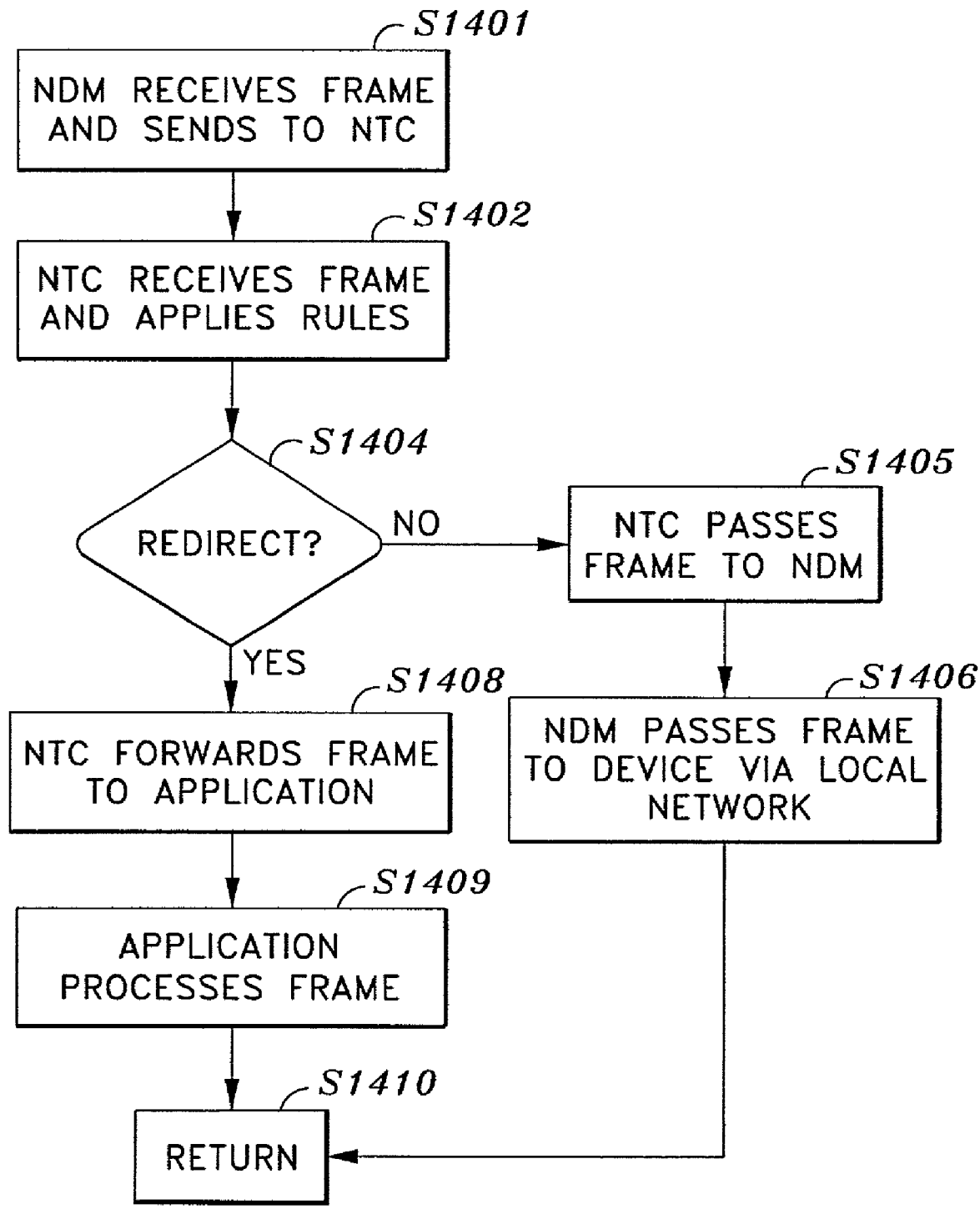
FIG. 14 is a flowchart for explaining the routing of an incoming frame according to one embodiment of the present invention.

FIG. 14 is a flowchart depicting the process mimic device 20 undertakes upon receiving a frame from external network 10. In step S1401, NDM 64 receives a frame from external network 10 and notifies NTC 65 that a frame is available for processing. Upon receiving notification of a received frame, NTC 65 begins processing the frame in step S1402 by applying the frame to the rule tables within rule tables 75 as described using FIG. 9. In applying the frame to rule tables 75, the frame may be passed through or redirected in step S1404 depending on the which rules are applied to the frame by NTC 65 during processing. If the frame is not redirected, NTC 65 passes the frame back to NDM 64 in step S1405 and NDM 64 passes the frame on to the device on the local network as indicated in the frame via the local network interface 31 in step S1406. After the frame is passed through by NDM 64, processing is returned to a wait state in step S1410.

On the other hand, if the rules applied by NTC 65 redirect the frame in step S1404, NTC 65 forwards the frame to the appropriate application module running on mimic device 20 as dictated by the rule action. In step S1409, the application module on mimic device 20 that receives the frame processes the frame. Once processing by the application module is complete, processing is returned to a wait state in step S1410.

Figure 15:
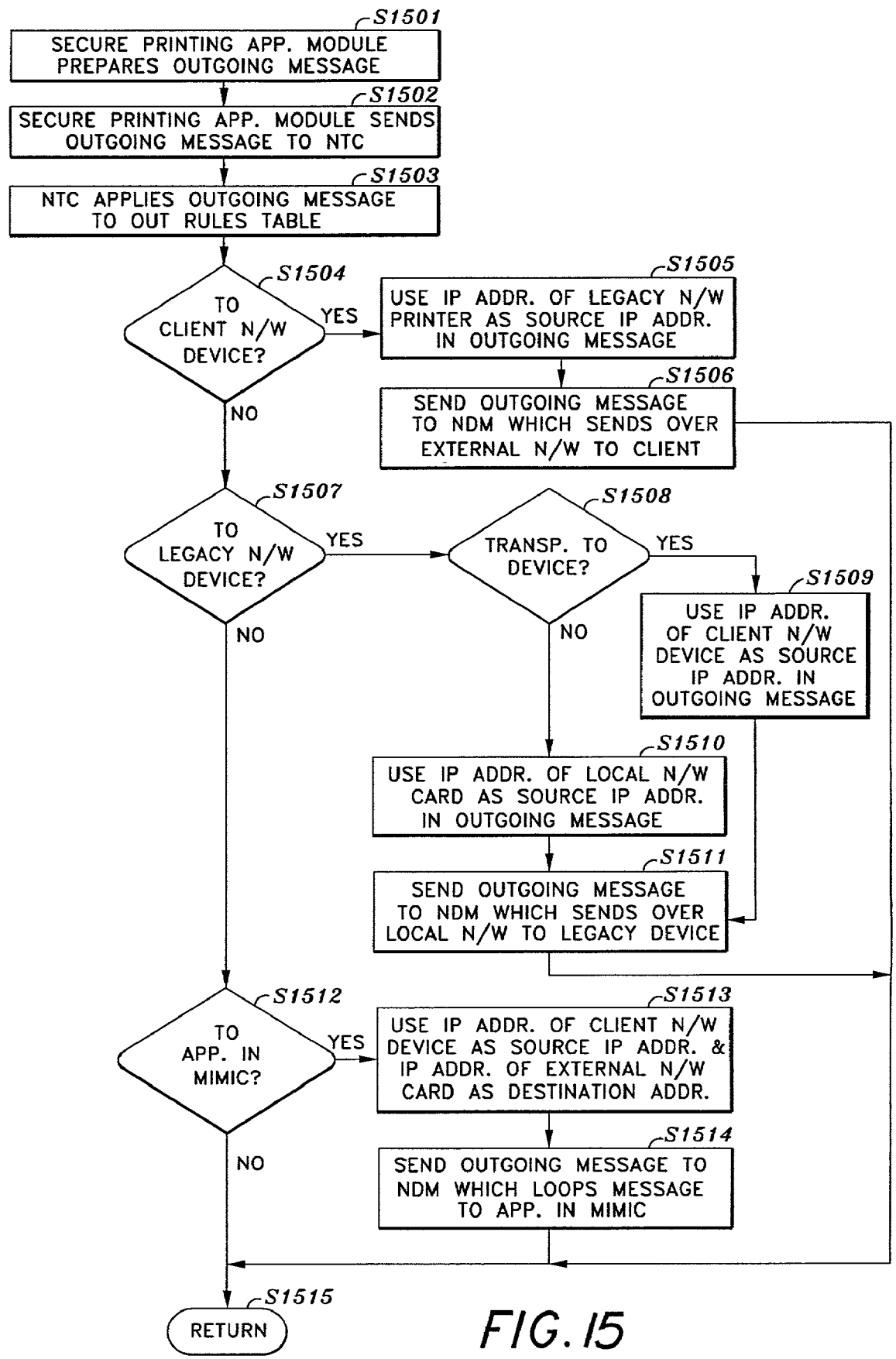
FIG. 15 is a flowchart for explaining the routing of an outgoing frame according to one embodiment of the present invention.

FIG. 15 is a flowchart for explaining how an application in mimic device 20 communicates with a device on either external network 10 or local network 14. For example, if e-mail printing application module 71 is supporting an e-mail printing function on behalf of legacy network printer 15, then e-mail printing application module 71 may need to communicate with the requesting client on external network 10, such as workstation 12, and may also need to communicate with legacy network printer 15 on local network 14 in order to spool the print job to legacy network printer 15. Accordingly, network messages prepared by e-mail printing application module 71 need to be addressed appropriately to the desired device on the appropriate network, and the source IP address in the outgoing message must also be set to achieve the desired effect of transparency. The example set forth in the flowchart of FIG. 15 is for an outgoing message from secure printing application module 70.

In step S1501, secure printing application module 70 prepares an outgoing message which may be an acknowledgment message to the requesting client device on external network 10 such as workstation 12, or may be a print spool message to legacy network printer 15. In step S1502, secure printing application module 70 sends the outgoing message to NTC 65. NTC 65 then applies the outgoing message to the out rule table of rules tables 75 in order to determine how the outgoing message should be addressed (step S1503). In step S1504, it is determined based on the out rule table whether the outgoing message is directed to the requesting client network device. If so, flow passes to step S1505 in which the IP address of the corresponding legacy network printer which secure printing application module 70 is acting on behalf of is used as the source IP address in the outgoing message. In this manner, the existence of mimic device 20 will be made transparent to the requesting client network device because the source IP address in the acknowledgment message received by the requesting client network device contains the source IP address of the legacy network printer which is performing the requested printing function. Next, after step S1505, the outgoing message is sent to NDM 64 which utilizes routing table 74 to determine that the outgoing message must be sent through external network interface card 22 over external network 10 to the requesting client network device, such as workstation 12 (step S1506). Flow then passes to return in step S1515.

If it is determined in step S1504 that the outgoing message from secure printing application module 70 is not directed to the requesting client network device, then flow passes to step S1507 in which it is determined whether the outgoing message is directed to the legacy network device, such as legacy network printer 15, which secure printing application module 70 is acting on behalf of. If it is determined in step S1507 that the outgoing message is directed to the corresponding legacy network device, then flow passes to step S1508 in which it is determined whether the outgoing message needs to be transparent to the legacy network device. In other words, it is determined whether the source IP address in the outgoing message should contain the IP address of the requesting client network device so that the legacy network device on local network 14 believes it is receiving a message directly from the requesting client network device instead of from mimic device 20. If it is determined in step S1508 that the outgoing message should be transparent to the legacy network device, flow passes to step S1509 in which the IP address of the requesting client network device is used as the source IP address in the outgoing message to the legacy network device. In such a case, flow then passes to step S1511 in which the outgoing message is sent to the NDM which utilizes routing table 74 to determine that the outgoing message should be sent via local network interface card 21 over local network 14 to the corresponding legacy network device. Flow then passes to return in step S1515.

If it is determined in step S1508 that it is not necessary for the outgoing message to be transparent to the legacy network device, then flow passes to step S1510 in which the IP address of local network interface card 21 is used as the source IP address in the outgoing message. As mentioned above, local network interface card 21 is preferably assigned a pre-registered IP address in order to avoid conflicts with any other device, either on local network 14 or on external network 10. It should be noted that even if more than one mimic device is present on external network 10, each mimic device can use the same preset IP address for communicating over its respective local network because each local network is isolated from external network 10 and therefore IP address conflicts are avoided. In this manner, each mimic device does not require a separate IP address to be assigned to it by the network administrator, thereby saving valuable IP addresses for other devices on external network 10. After step S1510, flow then passes to step S1511 in which the outgoing message is sent to NDM 64 which utilizes routing table 74 and sends the outgoing message through local network interface card 21 over local network 14 to the corresponding legacy network device, such as legacy network printer 15. Flow then passes to return in step S1515.

If it is determined in step S1507 that the outgoing message is not directed to the corresponding legacy network device, then flow passes to step S1512 in which it is determined whether the outgoing message is directed to another application residing in mimic device 20. For example, a request from a client network device on external network 10, such as workstation 12, may be a request for e-mail printing of a secure print job on legacy network printer 15. In such a case, the print job would require the services of e-mail printing application module 71 and secure printing application module 70. Accordingly, e-mail printing application module 71 would need to communicate with secure printing application module 70 to complete the decrypted e-mail print job prior to sending it to legacy network printer 15 for printing. Accordingly, an outgoing message from one of the aforementioned applications would be prepared and then handled within mimic device 20 such that it is sent back up to the other desired application for processing. Specifically, if it is determined that the outgoing message is directed to another application in mimic device 20, then flow passes to step S1513 in which the destination IP address of the outgoing message is set to the IP address of external network interface card 22 and the source IP address of the outgoing message is set to the IP address of the requesting client network device. In this manner, the destination IP address having a value corresponding to external network interface card 22 informs NDM 64 in conjunction with routing table 74 that the outgoing message is to be contained within mimic device 20. In addition, the source IP address in the outgoing message having the value of the requesting client network device allows the outgoing message to have transparency such that the receiving application within mimic device 20, such as e-mail printing application module 71, will believe that it received the message directly from the requesting client network device.

After step S1513, flow passes to step S1514 in which the outgoing message is sent to NDM 64 which consults routing table 74 and then, based on the destination IP address in the outgoing message having the value of external network interface card 22, loops the outgoing message back up to NTC 65 which in turn directs the outgoing message up to the desired application, such as e-mail printing application module 71. In this regard, it should be further explained that the outgoing message contains a port identifier corresponding to the desired destination application so that NTC 65 will be able to direct the outgoing message to the desired application in mimic device 20. For example, the outgoing message may request the services of e-mail printing and therefore it will have a port identifier within the outgoing message corresponding to e-mail printing application module 71. Accordingly, when the outgoing message is looped back from NDM 64 to NTC 65 as discussed above, NTC 65 will know that the outgoing message is directed to e-mail printing application module 71. After step S1514, flow passes to return in step S1515.

Based on the above discussion and accompanying figures, it can be appreciated that the present invention provides a general, efficient manner in which to augment the functional capabilities of existing, legacy network devices in a transparent fashion. Accordingly, the present invention reduces the need for replacing legacy network devices, such as network printers, with newer versions in order to provide support for new enterprise functions. In addition, because the mimic device acts on behalf of legacy network devices by responding to network messages addressed to the legacy network devices, minimal configuration effort is required on the part of the system administrator.

It should be appreciated that the mimic device described above is not limited to augmenting the functional capabilities of legacy network printers, but can also be applied to network copiers, network scanners, network workstations and other network devices. In addition, the above-described mimic device is not limited to the functional augmentation of network devices, but can also be easily configured to perform other functions. The rules contained in the rules tables described above can easily be configured by the applications manager and applications residing in the mimic device to allow the mimic device to perform a variety of different functions.

In a particular embodiment, the mimic device can be used to provide network connectivity to a device which does not inherently have such capability. In this embodiment, local network 14 would be a Universal Serial Bus (USB) network or another type of serial network and local network interface card 21 would support USB connectivity. The rules would then be configured to have mimic device 20 act on behalf of network messages from external network 10 which are directed to IP addresses assigned to the printers on the USB local network 14. One of other application modules 72 would then act as a translator between IP messages on external network 10 and USB messages on local network 14.

In a similar fashion, mimic device 20 can also be used as a docking station which connects to a device, such as a digital camera via local network 14 acting as a USB, or through another serial interface in place of local network interface card 21. For example, a digital camera connects to a serial port on mimic device 20 which then downloads digital images from the digital camera to the mimic device and passes the digital images over external network 10 to server 11 for storage. Again, this simply requires a reconfiguration of the rules described above, which can be performed by application manager module 78 and/or other applications in mimic device 20.

Mimic device 20 can also utilize its two independent network interface cards to act as a universal networking device. For example, the rules can be configured to instruct mimic device 20 to act as a router, a firewall, a NAT, a server or other network device. This is simply a matter of having one of the applications in mimic device 20 to configure the rules to instruct NTC 65 to perform the desired handling of frames detected on external network 10 and local network 14. In this regard, the rules in mimic device 20 can also be configured to simply monitor network traffic on one or both of external network 10 and local network 14, which could include capturing and recording some or all of the network traffic. Lastly, the rules of mimic device 20 can be configured to detect and intercept the transmission of undesirable network traffic in a defensive mode, or to send undesirable network traffic as an offensive, hostile mode.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method for mimicking network devices, the method being performed in a computing device having first and second network interface cards, the first network interface card connecting the computing device to an external network and the second network interface card connecting the computing device to a local network, the method comprising the steps of:

discovering each of a plurality of target network devices on the local network by listening to the local network for messages from the plurality of target network devices, and creating a target descriptor entry corresponding to each of the plurality of discovered target network devices in a target descriptor table;

creating a rule corresponding to each of the target descriptor entries in an inbound rules table containing a plurality of rules, wherein each of the plurality of rules corresponds to one of the plurality of the target network devices on the local network, wherein the each of the plurality of rules contains an IP address corresponding to the target network device, and wherein at least one of the plurality of rules indicates whether a functionality requested for a corresponding target network device to perform is to be processed by one of a plurality of application modules residing in the computing device;

receiving, via the first network interface card, an incoming message from a client network device residing on the external network, the incoming message being addressed to an IP address of a designated one of the plurality of target network devices;

determining, based at least in part on the rule corresponding to the designated target network device, if the incoming message requests a functionality that the one of the plurality of application modules is configured to perform, wherein the rule containing the IP address of a target network device in the inbound rules table that matches the IP address of the designated one of the plurality of target network devices is used to determine if the requested functionality is to be processed by the one of the plurality of application modules in the computing device, and wherein the processing of the requested functionality by the one of the plurality of application modules includes responding to the incoming message addressed to the target network device on behalf of the target network device;

redirecting, in the case that the incoming message requests the functionality that the one of the plurality of application modules is configured to perform, the incoming message to the one of the plurality of application modules which performs the requested functionality in response to the incoming message, wherein the one of the plurality of application modules performs the requested functionality on behalf of the designated one of the plurality of target network devices, and wherein the designated one of the plurality of target network devices lacks support for the requested functionality, wherein in the case that another application module of the plurality of application modules is configured to process another requested functionality after the processing of the requested functionality by the one of the plurality of application modules, a destination address of the incoming message is set to an IP address of the first network interface card; and passing, in the case that the incoming message does not request the functionality that the one of the plurality of application modules is configured to perform, the incoming message through the local network via the second network interface card to the designated target network device.

2. A method according to claim 1, wherein the designated target network device is a legacy network device.

3. A method according to claim 1, wherein the one of the plurality of application modules processes the functionality requested by the incoming message, and transmits data to the designated target network device as a result of the processing.

4. A method according to claim 3, wherein the requested functionality is e-mail printing, and wherein the data transmitted to the target network device is a rendered print job.

5. A method according to claim 1, wherein in the redirecting step, the performing of the requested functionality by the one of the plurality of application modules includes sending a response message from the one of the plurality of application modules over the external network to the client network device, the response message having a source identification address identical to a source identification address of the designated target network device.

6. A method according to claim 1, wherein in the redirecting step, the performing of the requested functionality by the one of the plurality of application modules includes sending a local message from the one of the plurality of application modules over the local network to the designated target network device which performs a function in response to the local message.

7. A method according to claim 1, wherein each of the plurality of rules contains a port identifier to indicate whether the functionality requested of the target network device corresponding to the rule is to be processed by a particular one of the plurality of application modules residing in the computing device.

8. A method according to claim 1, wherein the discovering step includes sending a discovery message to each discovered target network device and receiving discovery information in response to the discovery message from the corresponding target network device, wherein the discovery information is placed in the target descriptor entry for the corresponding target network device.

9. A method according to claim 8, further comprising a polling step of sending the discovery message on a periodic basis to the each discovered target network device, and receiving in response to the discovery message the discovery information from the corresponding target network device, wherein the target descriptor entry for the corresponding target network device is updated with the received discovery information.

10. A method according to claim 9, wherein in the case that the discovery information is not received in response to the discovery message for a particular one of the discovered target network devices, the target descriptor entry corresponding to the particular one of the discovered target network devices is deleted.

11. A method according to claim 1, further comprising the step of sending a notification for each of the plurality of discovered target network devices to the one of the plurality of application modules, the notification containing information related to the target descriptor entry for the corresponding target network device.

12. A method according to claim 1, further comprising the step of publishing the each of the target descriptor entries to the one of the plurality of application modules.

13. A method according to claim 6, wherein the second network interface card is assigned a preset IP address, and the local message contains a source IP address which is identical to the preset IP address.

14. A method according to claim 6, wherein the local message contains a source IP address which is identical to a source IP address of the client network device.

15. A method according to claim 1, wherein in the redirecting step, the performing of the requested functionality by the one of the plurality of application modules includes preparation of an outbound message for delivery to a designated device on one of the external network and the local network, and wherein a routing table is used to determine which one of the external network and the local network is used for sending the outbound message to the designated device.

16. A method according to claim 15, wherein the routing table contains a cross-reference indicator for the each of the plurality of target network devices to indicate which one of the external network and the local network is used for sending the outbound message to the designated device.

17. A method according to claim 15, wherein the routing table is used to determine whether a preset IP address of the second network interface card or a source IP address of the client network device is used as a source IP address in the outbound message.

18. A method according to claim 1, further comprising the step of tracking a port identifier of a port opened by the one of the plurality of application modules and creating a rule in the inbound rules table corresponding to the port identifier, wherein in the determining step, the rule corresponding to the port identifier is used to redirect the incoming message from the external network to the one of the plurality of application modules if the incoming message contains the port identifier corresponding to the rule.

19. A method according to claim 18, further comprising the steps of tracking an initial target port identifier of a port opened by one of the plurality of target network devices, mapping the initial target port identifier to a new target port identifier, creating a first map rule in the inbound rules table corresponding to the target network device which maps the initial target port identifier to the new target port identifier, and creating a second map rule in an outbound rules table corresponding to the target network device which maps the new target port identifier to the initial target port identifier.

20. A method according to claim 1, wherein the local network is a USB network, the target network device is a printer, and the inbound rules table contains at least one rule which is used in the determining step to redirect the incoming message for the printer from the external network to the one of the plurality of application modules which sends a USB message over the local network to the printer in response to the incoming message.

21. A method according to claim 1, wherein the local network is a USB network, the target network device is a digital camera, and further including the steps of downloading a digital image to the one of the plurality of application modules from the digital camera via the local network, and sending the digital image to a server on the external network.

22. A method according to claim 1, wherein the inbound rules table contains rules which are used in the determining step to route the incoming message from the external network to the designated target network device on the local network.

23. A method according to claim 1, wherein the inbound rules table contains rules which are used in the determining step to capture the incoming message from the external network and further including the step of preventing transmission of the incoming message on the local network.

24. A method according to claim 1, wherein the inbound rules table contains rules which are used in the determining step to determine that all incoming messages from the external network are not to be processed by any of the plurality of application modules, whereby all of the incoming messages from the external network are passed through the local network.

25. A method according to claim 1, wherein the one of the plurality of application modules is a file server which sends at least one file over the local network to the designated target network device and at least one file over the external network to the client network device.

26. A method according to claim 1, wherein the inbound rules table contains rules which are used in the determining step to determine that a set of designated incoming messages are copied to the one of the plurality of application modules, which records each of the set of designated incoming messages.

27. A method according to claim 1, wherein the inbound rules table contains rules which are used in the determining step to detect if the incoming message is an undesirable message, and in the case that the incoming message is an undesirable message, the incoming message is to be processed by the one of the plurality of application modules, whereby the incoming message is redirected to the one of the plurality of application modules.

28. A method according to claim 1, further including the step of transmitting a plurality of undesirable messages from the one of the plurality of application modules over one of the external network and the local network.

29. A computing device for mimicking network devices, the computing device having first and second network interface cards, the first network interface card connecting the computing device to an external network and the second network interface card connecting the computing device to a local network, said computing device comprising:
a program memory for storing process steps executable to perform a method according to any of claims 2, 3 or 4 to 28, and a processor for executing the process steps stored in said program memory.

30. Computer-executable process steps stored on a computer readable medium, said computer-executable process steps for mimicking network devices and for being performed in a computing device having first and second network interface cards, the first network interface card connecting the computing device to an external network and the second network interface card connecting the computing device to a local network, said computer-executable process steps comprising process steps executable to perform a method according to any of claims 2, 3 or 4 to 28.

31. A computer-readable medium which stores computer-executable process steps, the computer-executable process steps to mimic network devices and to be performed in a computing device having first and second network interface cards, the first network interface card connecting the computing device to an external network and the second network interface card connecting the computing device to a local network, said computer-executable process steps comprising process steps executable to perform a method according to any of claims 2, 3 or 4 to 28.

* * * * *